(12) United States Patent
Hyatt et al.

(10) Patent No.: US 6,729,810 B2
(45) Date of Patent: May 4, 2004

(54) SELECTIVELY BIASED TOOL AND METHODS OF USING THE SAME

(75) Inventors: Gregory Aaron Hyatt, West Chester, OH (US); David Wayne Bricker, Batavia, OH (US)

(73) Assignee: Makino, Inc., Mason, OH (US)

( * ) Notice: Subject to any disclaimer, the term of this patent is extended or adjusted under 35 U.S.C. 154(b) by 0 days.

(21) Appl. No.: 10/346,777

(22) Filed: Jan. 17, 2003

(65) Prior Publication Data

US 2003/0129032 A1 Jul. 10, 2003

Related U.S. Application Data

(60) Division of application No. 09/810,593, filed on Mar. 16, 2001, now Pat. No. 6,536,998, which is a continuation-in-part of application No. 09/392,114, filed on Sep. 8, 1999, now Pat. No. 6,270,295.

(60) Provisional application No. 60/099,464, filed on Sep. 8, 1998, and provisional application No. 60/265,015, filed on Jan. 30, 2001.

(51) Int. Cl.[7] .............................................. B23B 35/00
(52) U.S. Cl. ......................... 408/1 R; 82/1.11; 82/1.5; 408/147
(58) Field of Search ................... 408/1 R, 147, 408/57, 59, 156; 82/1.11, 1.2, 1.4, 1.5

(56) References Cited

U.S. PATENT DOCUMENTS

| | | | |
|---|---|---|---|
| 2,867,139 A | 1/1959 | Caldwell | |
| 3,067,637 A | 12/1962 | Horning | |
| 3,115,051 A | 12/1963 | Burg | |
| 3,311,003 A | 3/1967 | Daugherty | |
| 3,389,621 A | 6/1968 | Wear | |
| 3,622,247 A | * 11/1971 | Greenberg et al. | .......... 408/147 |
| 3,714,537 A | 1/1973 | Bur | |
| 3,735,459 A | 5/1973 | Allen | |

(List continued on next page.)

FOREIGN PATENT DOCUMENTS

| | | |
|---|---|---|
| DD | 143046 | 7/1980 |
| DD | 212669 | 8/1984 |
| GB | 2013539 | 8/1979 |
| JP | 14088 | 2/1979 |
| SU | 222124 | 10/1968 |
| SU | 1196154 | 12/1985 |
| SU | 1278118 | 12/1986 |
| SU | 1583227 | 8/1990 |

*Primary Examiner*—Daniel W. Howell
(74) *Attorney, Agent, or Firm*—Dinsmore & Shohl LLP

(57) ABSTRACT

A tool including a working portion with a working member, a side surface and an end surface. The working portion includes a passage passing through the side surface and the end surface. At least one seal is adapted to restrict fluid flow through the side surface and the end surface and at least partially defines a pressure chamber. The working member is adapted to be selectively pivotally positioned by selectively pressurizing the pressure chamber. The tool similarly enables unique methods of working workpieces.

29 Claims, 13 Drawing Sheets

U.S. PATENT DOCUMENTS

| | | | |
|---|---|---|---|
| 3,757,637 A | | 9/1973 | Eich et al. |
| 3,864,054 A | * | 2/1975 | Eysel .................... 408/147 |
| 3,937,586 A | | 2/1976 | Watson |
| 3,966,347 A | | 6/1976 | Watson |
| 3,977,194 A | | 8/1976 | Klee et al. |
| 4,019,246 A | | 4/1977 | Tomita et al. |
| 4,067,251 A | | 1/1978 | Eckle et al. |
| 4,087,890 A | | 5/1978 | Ishizuka et al. |
| 4,163,624 A | | 8/1979 | Eckle |
| 4,184,391 A | | 1/1980 | Eckle |
| 4,200,418 A | | 4/1980 | Kress et al. |
| 4,224,846 A | | 9/1980 | Eysel et al. |
| 4,245,939 A | | 1/1981 | Sear |
| 4,289,431 A | | 9/1981 | Berstein |
| 4,350,054 A | | 9/1982 | Werth, Jr. |
| 4,387,612 A | | 6/1983 | Eckle et al. |
| 4,409,721 A | | 10/1983 | Tomita et al. |
| 4,417,379 A | | 11/1983 | Goode |
| 4,443,140 A | | 4/1984 | Boetto |
| 4,480,700 A | | 11/1984 | Kieger |
| 4,489,629 A | | 12/1984 | D'Andrea |
| 4,607,549 A | | 8/1986 | Krempel |
| 4,634,324 A | | 1/1987 | Eckle et al. |
| 4,637,285 A | | 1/1987 | Mizoguchi |
| 4,742,738 A | * | 5/1988 | Strand .................... 82/1.4 |
| 4,762,037 A | | 8/1988 | Stoffel |
| 4,786,217 A | | 11/1988 | Johne |
| 4,913,602 A | | 4/1990 | Peter et al. |
| 4,941,782 A | | 7/1990 | Cook |
| 5,033,918 A | | 7/1991 | Eysel et al. |
| 5,116,171 A | | 5/1992 | Gerk et al. |
| 5,251,511 A | | 10/1993 | Muendlein et al. |
| 5,304,019 A | | 4/1994 | Klee et al. |
| 5,307,714 A | | 5/1994 | Muendlein et al. |
| 5,368,420 A | | 11/1994 | Gerk et al. |
| 5,427,480 A | | 6/1995 | Stephens |
| 5,599,146 A | | 2/1997 | Scheer |
| 5,655,422 A | | 8/1997 | Stolz et al. |
| 5,713,703 A | | 2/1998 | Gerk et al. |
| 5,865,573 A | | 2/1999 | Kress |
| 6,196,773 B1 | * | 3/2001 | Hyatt et al. ............... 408/1 R |
| 6,243,962 B1 | * | 6/2001 | Brock .................... 33/542 |
| 6,270,295 B1 | | 8/2001 | Hyatt et al. |
| 6,536,998 B2 | * | 3/2003 | Hyatt et al. ............... 408/147 |

* cited by examiner

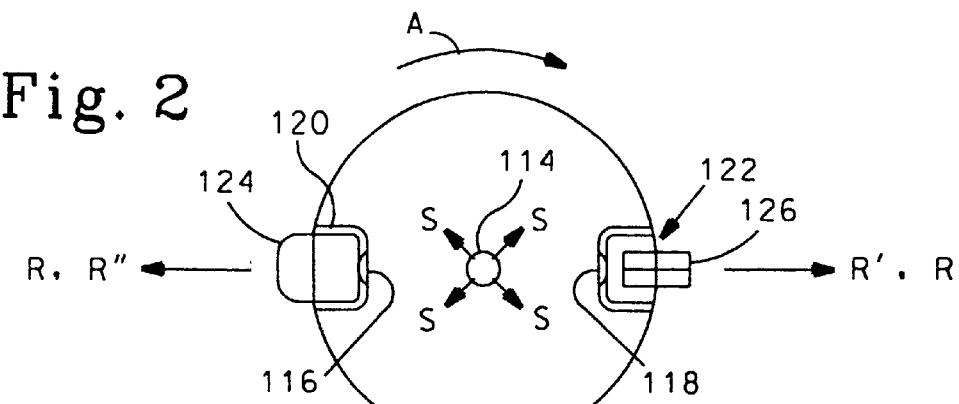
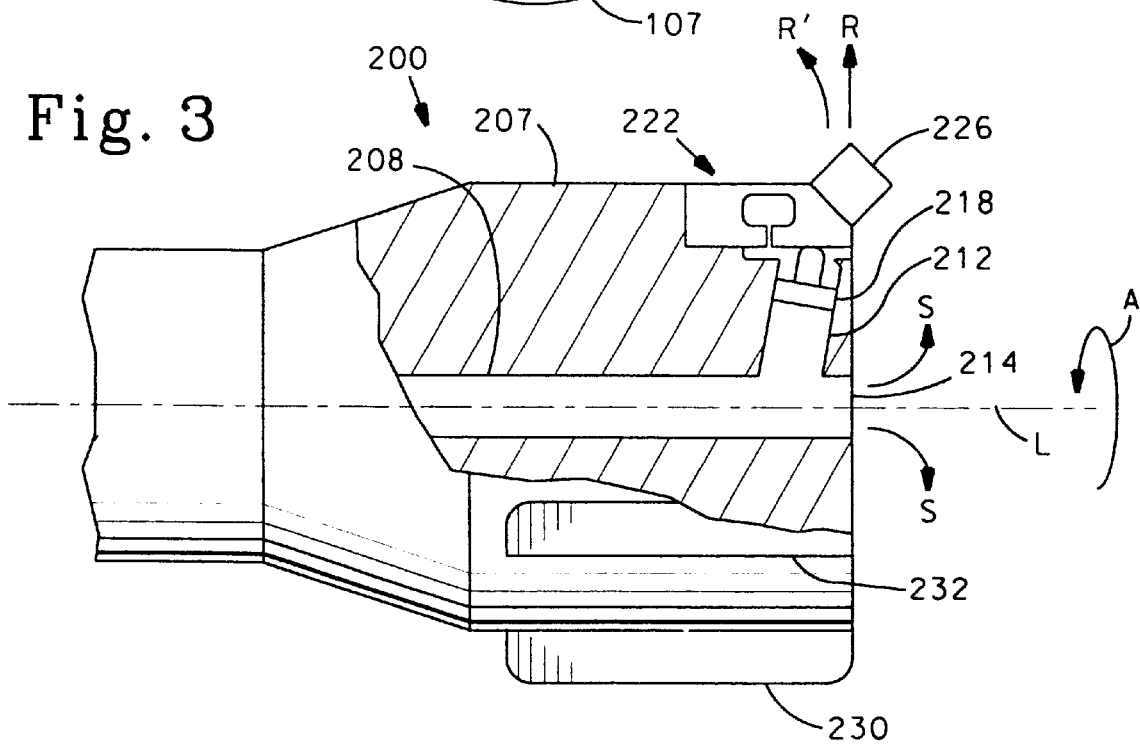
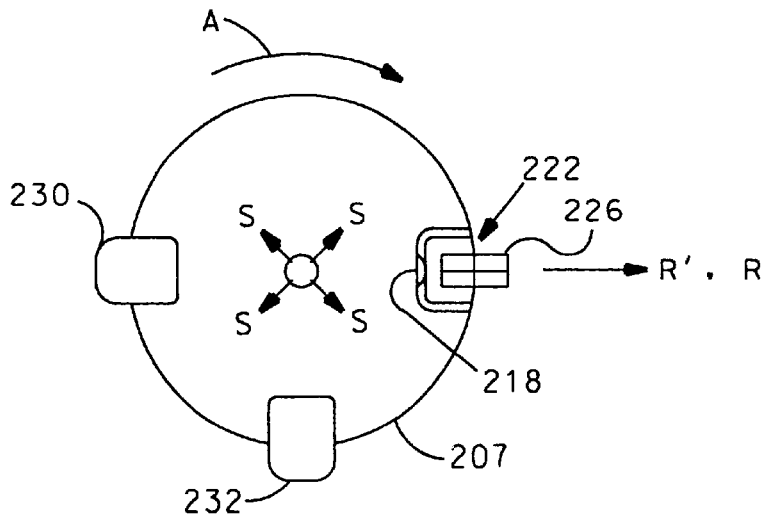

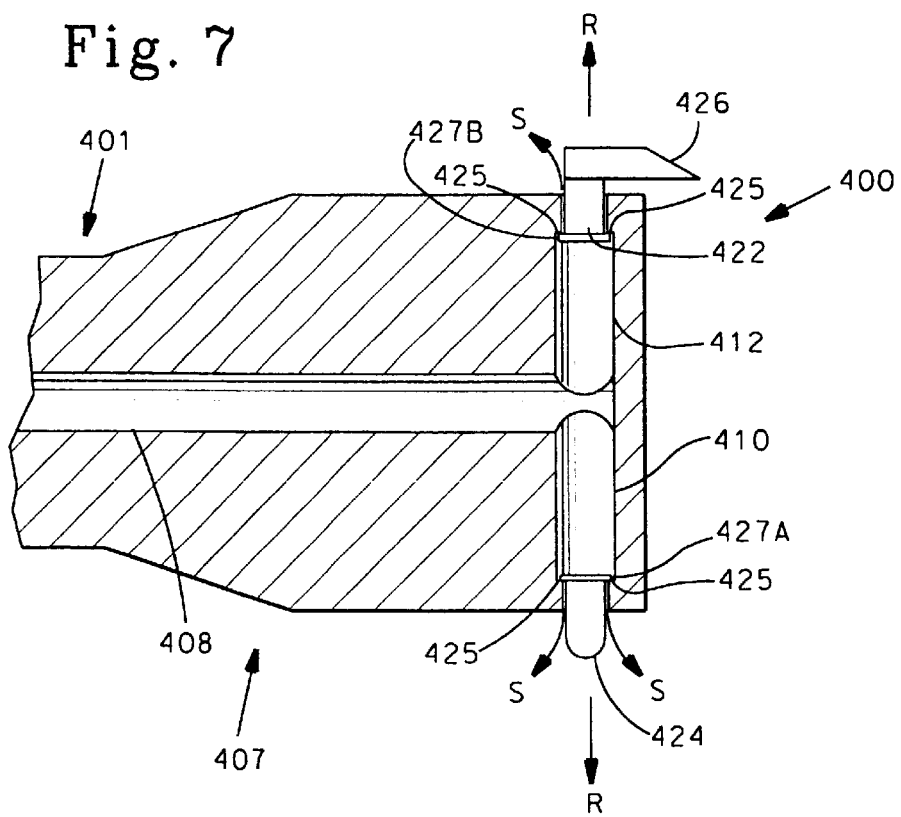
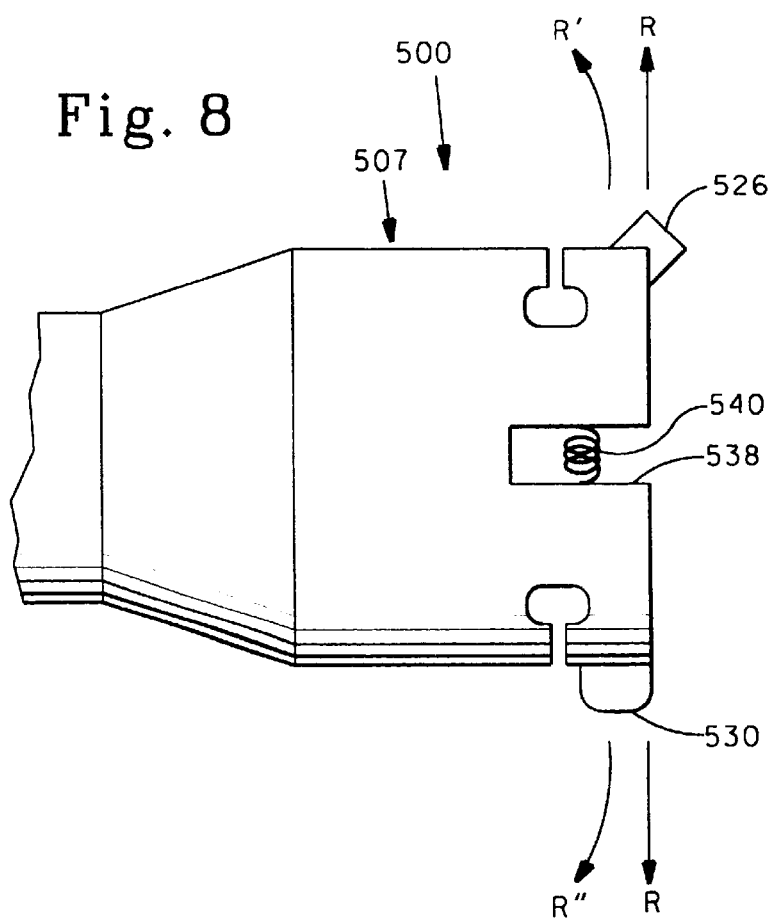

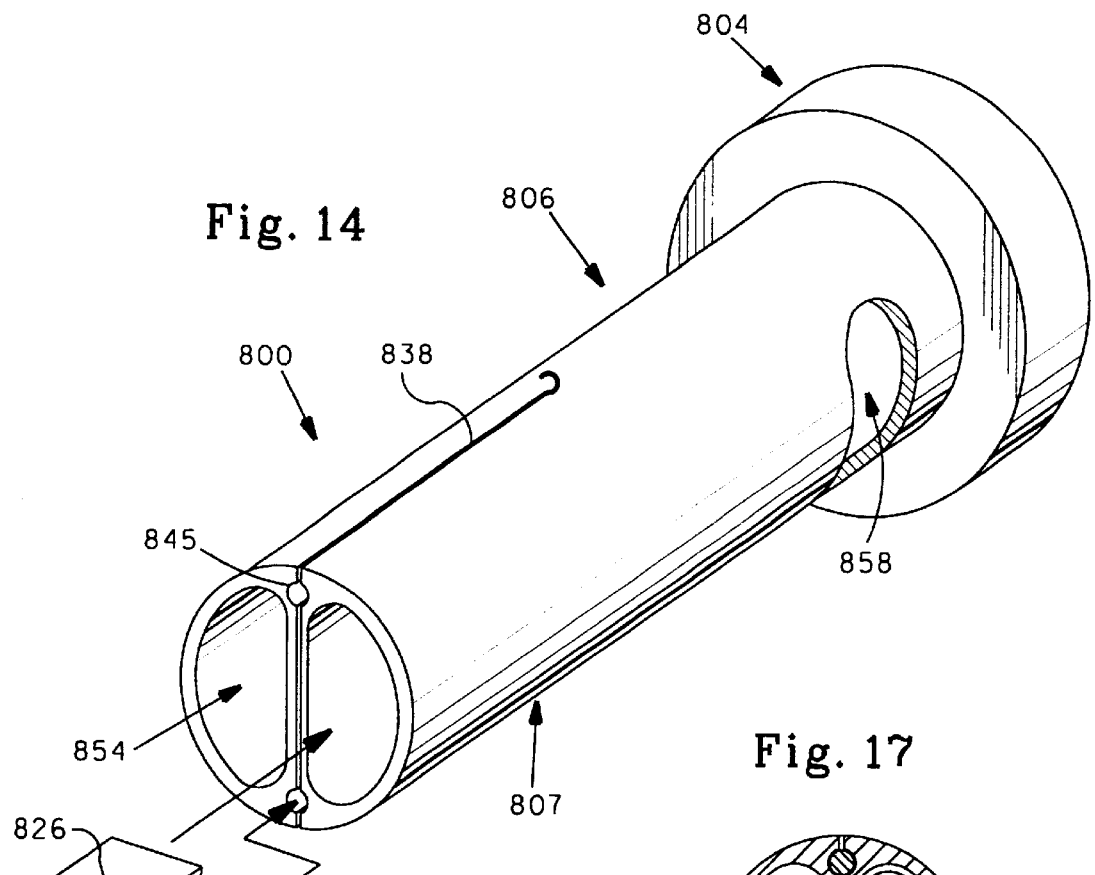
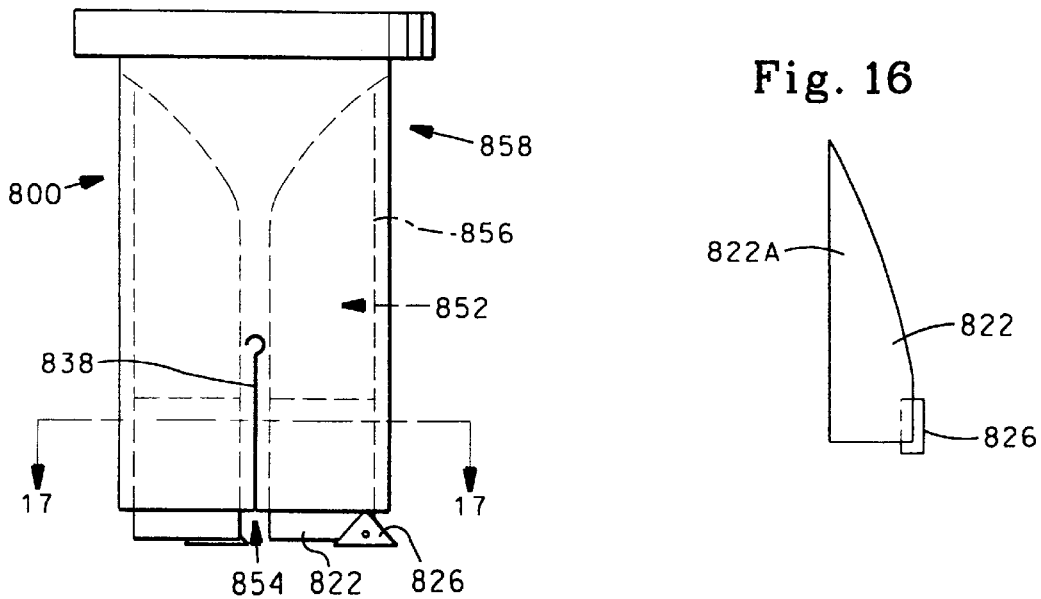

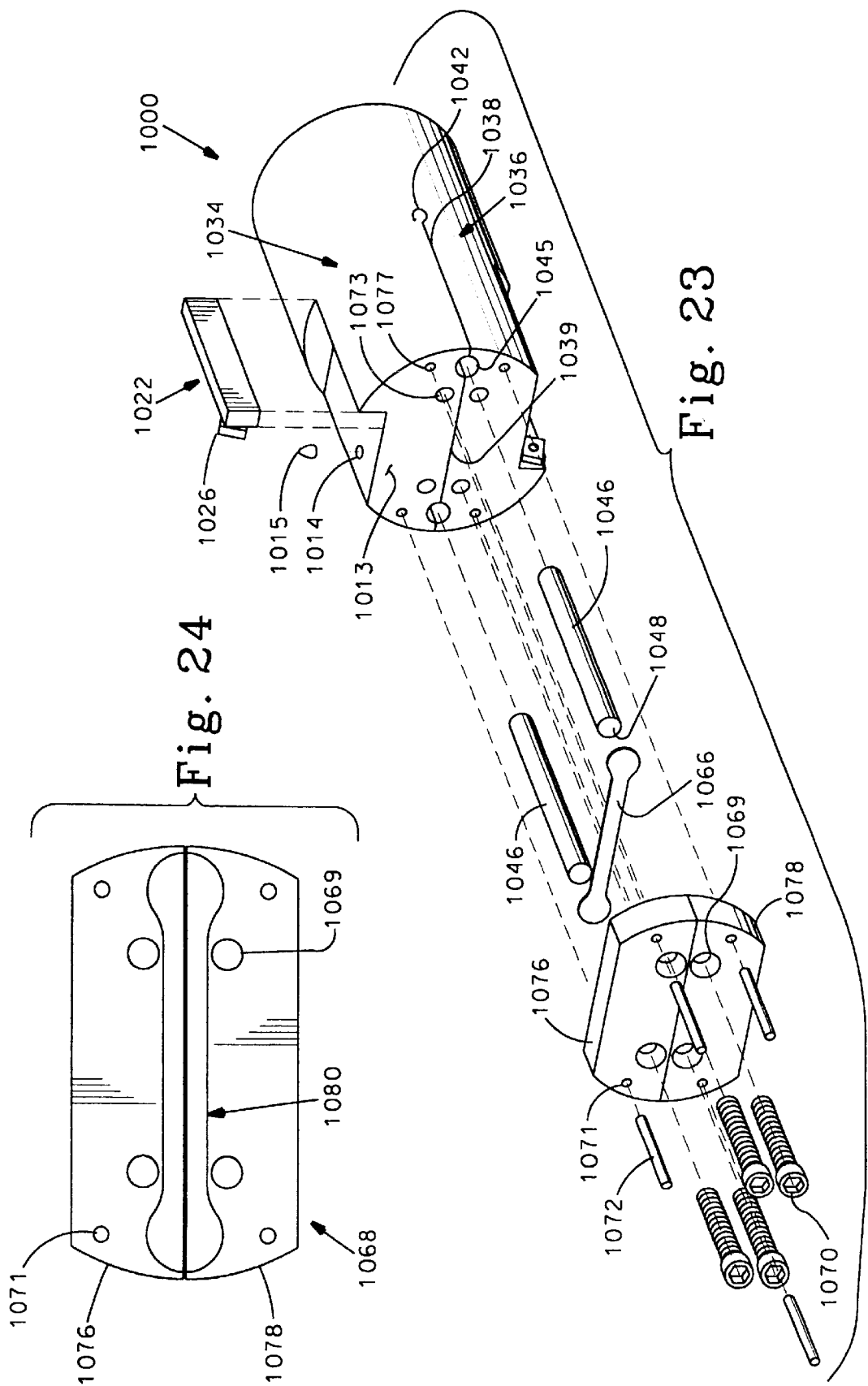

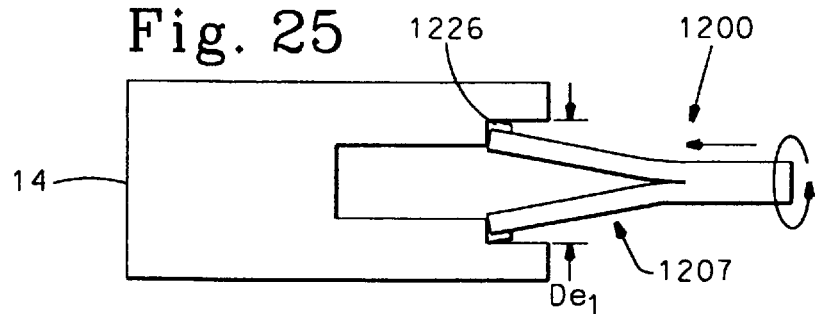
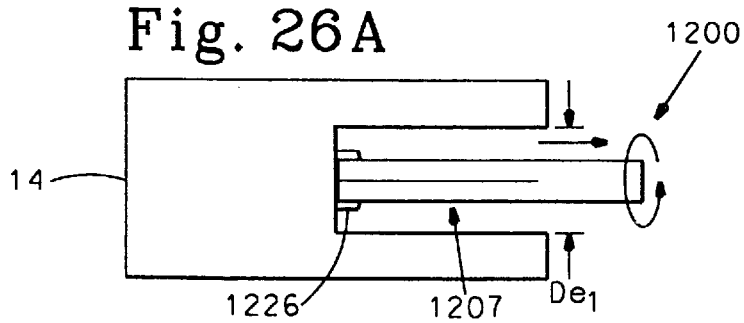
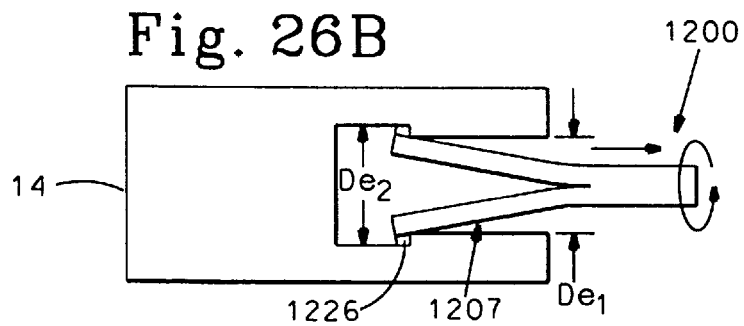
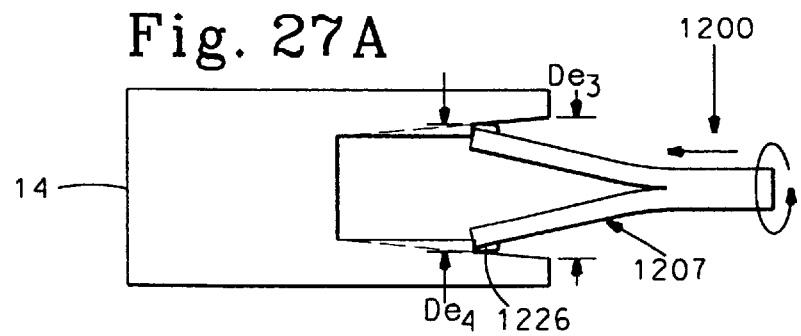
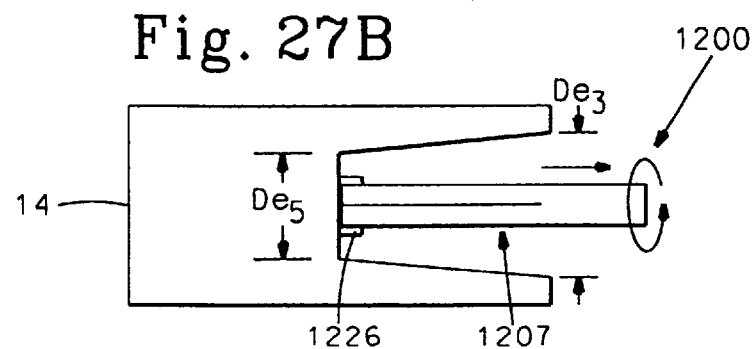

SELECTIVELY BIASED TOOL AND METHODS OF USING THE SAME

REFERENCE TO RELATED APPLICATIONS

This application is a division of U.S. application Ser. No. 09/810,593 filed Mar. 16, 2001, now U.S. Pat. No. 6,536,998, which claims the benefit of U.S. Provisional Application No. 60/265,015, filed Jan. 30, 2001 and which is a continuation-in-part of U.S. application Ser. No. 09/392,114 filed Sep. 8, 1999, now U.S. Pat. No. 6,270,295, which claims the benefit of U.S. Provisional Application No. 60/099,464 filed Sep. 8, 1998.

TECHNICAL FIELD OF THE INVENTION

The present invention is directed to an adjustable tool, and more particularly to a selectively biased tool and methods of using the same.

BACKGROUND OF THE INVENTION

A conventional gun reamer tool includes a cutting blade and one or more support members which are supported at intervals around the circumference of a rotary shaft (e.g., the reamer head). The shaft, along with the blade and the support members, rotate so that the physical interference between the rotating blade and the workpiece cause a hole to be either bored or reamed in the workpiece. During this machining operation, the rotating support members are positioned so that they support the inside surface of the hole being machined (e.g., either reamed or bored) by constraining radially directed motion of the blade relative to the workpiece.

In some conventional machining center rotating machine tools, lubricant is supplied to the vicinity of the cutting blade through the rotating shaft. An example is shown in U.S. Pat. No. 5,775,853 issued on Jul. 7, 1998, the disclosure of which is herein incorporated by reference.

This support and constraint supplied by the support members help to control the shape (e.g., cylindricity or circularity) of the hole, and help to maintain a constant alignment of the central axis of the hole along the length of the hole (in other words, the hole is straighter). For this reason, gun reamers are often used in applications where holes need to be precisely and accurately machined. Such precision applications may also be needed in the manufacture of automobile parts such as cylinder bores in engine blocks, connecting rod bores and piston wrist pin bores.

Gun reamers are also especially useful where the hole being cut is relatively long (such as the bore of a gun barrel), because the support members will remain in the proximity of the cutting blade, even when the blade has cut a long distance into the workpiece.

One potential shortcoming of conventional gun reamers is that they cannot be adjusted to cut holes of different sizes. Most conventional gun reamers are designed with support and blade members rigidly constrained to the reamer head so that the head can cut holes of just one predetermined radius. Another potential shortcoming of conventional gun reamers is that the blade and support members wear at different rates, which can cause seizure or variation in the diameter and/or circularity of the holes cut by the gun reamer.

In most machine tool operations, including boring and reaming, the friction between the tool and workpiece generates tremendous amounts of heat energy, which can reach temperatures of 2000° F. (1100° C.) and above. If left uncontrolled, such heat could severely damage (e.g., cracking or fracturing) the tool, thus reducing its tool life, making machine tool operations more dangerous and expensive, and reducing the quality and precision of the workmanship. In addition, heat generated friction can discolor the workpiece, and can damage or remove temper or heat treatments. It is commonly known in the industry that coolant can be introduced to the machining area, such as by spraying, to reduce friction between the tool and workpiece by providing coolant fluid between the cutting tool and the workpiece, and to help remove heat energy generated in machine tool operations.

Although coolant fluid can be supplied to the machining area, it is often difficult to insure that such fluid actually makes its way to the interstices between the tool and all of the workpiece surfaces being machined. Additionally, fluid can evaporate quickly due to the high temperatures involved in machining operations. Thus, larger volumes of coolant fluid must generally be continuously supplied to the machining area for the tool to operate effectively. This need to keep coolant fluid between the tool and wall of the bore hole becomes even more problematic in operations where coolant fluids cannot be introduced in close proximity to the machining areas while the tool is engaged with the interior surface of the workpiece.

During use, the work engaging surface of the tool (e.g., the cutting blade and/or support member) can also become loaded with particles or recently cut chips from the interior surface of the workpiece, which in turn, reduces the accuracy and effectiveness of the tool through deteriorating machining ability, and/or clogging of conventional coolant fluid supply openings. It is obviously preferred that the potential for this undesired loading of particles be reduced, and that any loaded particles be removed from the tool as quickly as possible. Typically, nozzle arrangements, such as an external cleaning jet, are provided independent of the tool, for injecting coolant fluid at increased velocities toward the work engaging surface and the work surfaces of the workpiece to wash away particles, to remove particles already loaded on the work surface, and to cool the tool and the workpiece. As mentioned before, it is often very difficult to insure that the fluid sprayed in this way actually reaches the most critical areas of the tool/workpiece interface.

Other attempts to deliver coolant fluid to the machining area have included air or other pneumatic carriers. As with externally applied liquid coolants, when pneumatic carriers are used, resulting turbulence can hinder the machining operations, and often fluid cannot infiltrate into the actual machining area. Previously, attempts to address these two requirements of cooling and cleaning the tool and workpiece have tended to reduce the accuracy and utility of the tool.

As can be seen, currently available tools have a number of shortcomings that can greatly reduce the accuracy of the tools, the tool's life, and its ability to use these tools with automatic tool changing systems. The current structures and assemblies provide a tool having working surfaces that cannot expand to accommodate varying and different uses and needs. Such assemblies can result in uneven machining, and reduces the assembly's usable life. A need currently exists in the machinery industry for a tool with a work engaging assembly having accurately controlled machining diameters so that holes of different sizes can be cut, so that tools cannot become oversized a result of excessive strokes of the tools, and so that the tool can expand in a radial direction uniformly and selectively.

SUMMARY OF THE INVENTION

It is an object of the present invention to provide a cutting tool that addresses and overcomes the above-mentioned shortcomings and problems in the machine tool industry.

It is another object of the present invention to provide a cutting tool with support members to support a workpiece, where the support member and/or a blade member are selectively biased.

It is another object of the present invention to provide a cutting tool whereby the relative position of the blade and the workpiece can be controlled by the selective control of the bias of the blade member and/or support member.

It is yet another object of the present invention to provide a cutting tool that has an increased tool life.

It is also an object of the present invention to provide a tool that eliminates the need for external coolant fluid jets for cleaning or removing loaded particles from the tool's machining surface during use, and routes fluid in close proximity to the work engaging surface to wash away recently cut particles.

It is yet another object of the present invention to provide a tool where the workload is reliably distributed over substantially the entire work engaging surface.

It is another object of the present invention to provide a tool for accurately and uniformly machining a workpiece.

It is further an object of the present invention to provide a tool that can be selectively adjusted during machine operations.

Yet another object of the present invention is to provide a tool that can compensate for material deformation in a workpiece.

It is still another object of the present invention to provide a tool in which coolant fluid delivery to the working area is not inhibited while the tool is engaged with a surface of the workpiece.

A further object of the present invention is to provide a tool that can compensate for wear and tear.

It is yet an object of the present invention to provide a tool that can be used with a quick change or automatic changeable tool system having a fluid pressure source.

Still another object of the present invention is to provide a tool that can be used to machine holes of different or varying diameters.

It is a further object of the present invention to provide a tool that continuously, selectively, and controllably delivers coolant fluid to the machining area despite the type of tool engagement.

Yet another object of the present invention is to provide a tool which self regulates itself for wear and tear on the abrasive.

Still a further object of the present invention is to provide a device where the work engaging surface can be uniformly varied in a radial direction by selectively applying fluid pressure.

A further object of the present invention is to provide a tool that dissipates thermal energy generated in the machining operations, and reduces thermal expansion of the tool.

Additional objects, advantages and other features of the invention will be set forth and will become apparent to those skilled in the art upon examination of the following, or may be learned with practice of the invention.

In some exemplary embodiments of the present invention, the support member and/or blade member of the cutting tool can be selectively biased by selecting the fluid pressure of a fluid which bears on the support member and/or blade member. For example, the tool may be constructed so that pressurized lubricating fluid, which is supplied near or in the vicinity of the cutting blade, bears on and biases both the blade member and the support member. As another exemplary alternative, the blade member and/or the support member may be selectively biased by air pressure and/or by one or more springs.

In some exemplary embodiments of the present invention, the tool is a reamer which has at least one support member and a blade member, such as a blade cartridge, biased by selectively pressurized fluid. It is an advantage of these exemplary reamer embodiments that the fluid pressure can be selected to compensate for wear of the blade, and also to compensate for the difference in wear between the blade and the support member.

In some exemplary embodiments of the present invention, the tool is a reamer where both the blade member and the support members are biased by selectively pressurized fluid. In these exemplary reamer embodiments, the fluid pressure can be selected to control the diameter of the hole so that a single reamer can ream holes of different diameters. Also, the fluid pressure can be selected to compensate for wear of the cutting blade. Also, the fluid pressure can be selectively controlled as the hole is being reamed to control the longitudinal profile of the hole, or to compensate for workpiece deformation which can occur as the hole is reamed.

In another exemplary embodiment, the tool includes a working portion with a working member, a side surface and an end surface. The working portion includes a passage passing through the side surface and the end surface. The tool further includes at least one seal adapted to restrict fluid flow through the side surface and the end surface and at least partially defining a pressure chamber. The working member is adapted to be selectively pivotally positioned to any of a variety of working positions in use by selectively pressurizing the pressure chamber.

Still another exemplary embodiment of the invention involves a method of removing material from a workpiece. With such method, a tool is provided including a working portion with a working member. Fluid pressure is provided to pivot the working member outwardly to at least one of a plurality of alternative use positions. The tool is then moved towards the workpiece such that the working member selectively removes material from the workpiece as the working member is applied to the workpiece. It will be understood that the tool can be moved before, during and/or after adjustment of the working member to the use position.

Still other objects of the present invention will become readily apparent to those skilled in this art from the following description wherein there is shown and described an exemplary embodiment of this invention, simply by way of illustration, of one of the best modes contemplated for carrying out this invention. As will be realized, the invention is capable of other different embodiments, and its several details are capable of modification in various aspects all without departing from the invention. Accordingly, the drawings and descriptions will be regarded as illustrative in nature, and not as restrictive.

BRIEF DESCRIPTION OF THE DRAWINGS

The present invention as set forth in the detailed description will be more fully understood when viewed in connection with the drawings in which:

FIG. 2 is an end view of the tool of FIG. 1;

FIG. 3 is a partial cross-sectional view of an alternative embodiment of a tool according to the present;

FIG. 4 is an end view of the tool of FIG. 3;

FIG. 7 is a cross-sectional view of another alternative embodiment of a tool according to the present invention;

FIG. 8 is a side view of yet another embodiment of a tool according to the present invention;

FIG. 14 shows an exploded prospective view of another alternative embodiment of the tool according to the present invention;

FIG. 15 shows an elevational view of the tool of FIG. 14;

FIG. 16 shows a side elevational view of a blade cartridge used with the present invention;

FIG. 17 shows a sectional view taken along line 17—17 of the tool of FIG. 15;

FIG. 23 is an exploded perspective view of the tool of FIG. 21;

FIG. 24 is a rear view of an end cap in accordance with the present invention;

FIG. 25 is a schematic illustration of a portion of a method of boring as the tool is inserted in accordance with the present invention;

FIG. 26A is a schematic illustration of a portion of a method of removing the tool without contacting the interior service of the bore in accordance with the present invention;

FIG. 26B is a schematic illustration of a portion of a method of boring while removing the tool in accordance with the present invention;

FIG. 27A is a schematic illustration of a portion of a method of changing boring diameters as the tool is inserted in the bore; and FIG. 27B is a schematic illustration of a portion of a method of removing the tool from without contacting the frustoconical surface of the bore in accordance with the present invention.

DETAILED DESCRIPTION OF THE EXEMPLARY EMBODIMENTS

Figure 1:
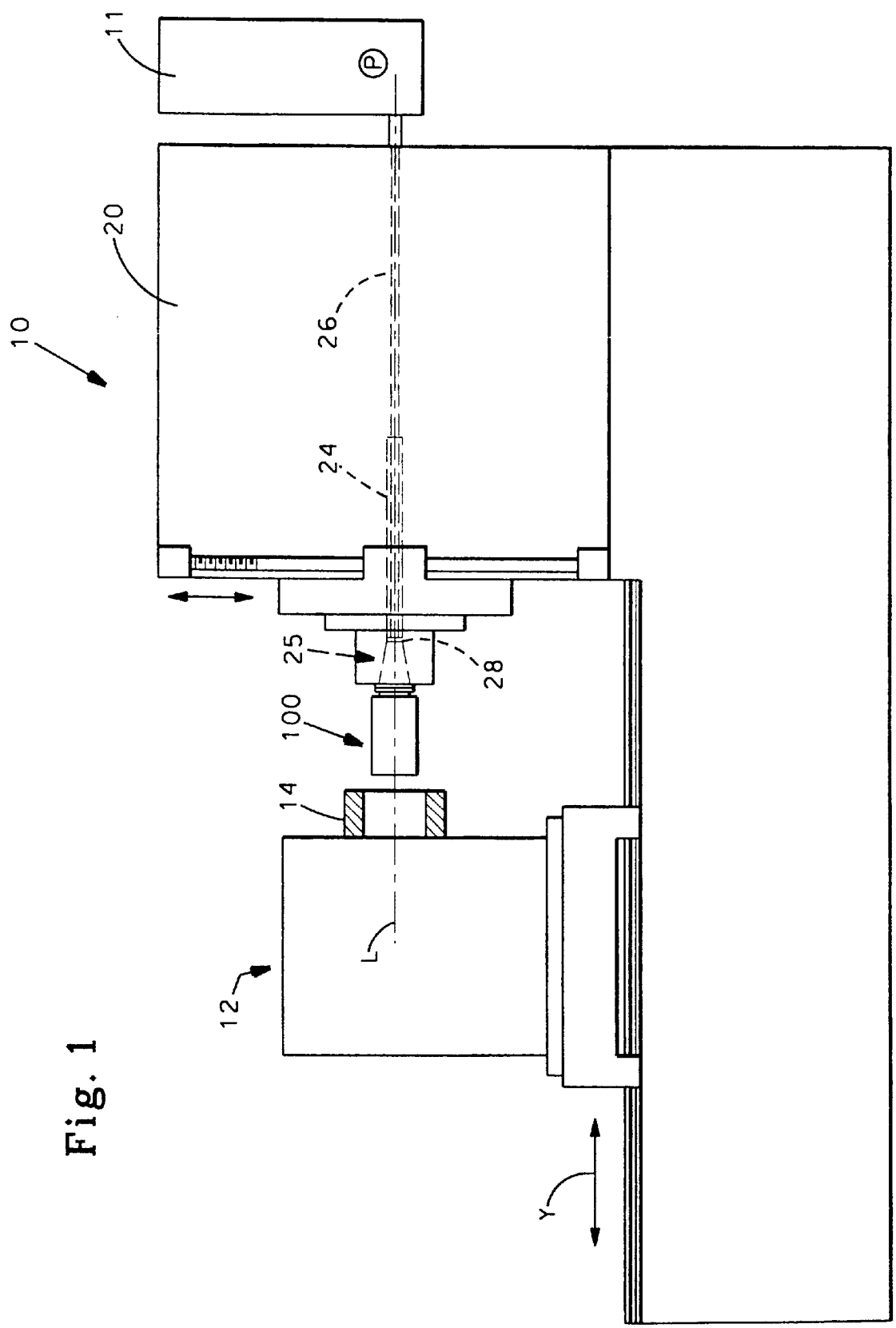
FIG. 1 shows a schematic elevational view of a machining center and tool of the present invention with through spindle coolant fluid communication between a tool of the present invention and a fluid supply.

Referring now to the drawings in detail, wherein like numerals indicate the same elements throughout the Figures, FIG. 1 illustrates working area 10 which typically comprises a machining station 20 and a work head 12 having a workpiece 14 attached thereto using fixtures and techniques known in the industry. Workpiece 14 is illustrated as a single exemplary structure having a bore hole or similar hollow interior portion which requires honing or finishing. In operation, the tool 100 and workpiece 14 are generally rotated or moved respectively to each other as tool 100 is brought into contact with the workpiece 14 (see arrow "Y") in order to enable machining operations such as honing.

The present invention may be adapted for use with a machining station or center 20 having a machine spindle 24 which can be rotated at varying speeds by a power source (not shown), and which can quickly and easily receive and secure one of a plurality of tools for various operations (i.e., rotating, vibrating or oscillating). A machining station 20 typically has a synchronized system, such as an automatic tool changer (not shown), for quickly and easily interchanging and utilizing multiple matching tools at one machining station or center 20, thereby allowing machining station 20 to provide greater utility or range of operations, (i.e., they are not dedicated to a single operation or use of a single type of tool).

Any engaging assembly (e.g., 25) (i.e., clamping or otherwise securing) the proximal end 104 of the tool 100 in a generally cantilevered fashion with the machine spindle 24, such as a drawbar, a collet, a mandrel device, or other device known in the industry, can be used, so long as fluid can be provided to the tool 100 adjacent the spindle/tool interface 28 while the tool 100 is in use. An exemplary engaging assembly 25 allows for quick interchange of tools and provision of fluid communication between the spindle passage 26 and the fluid distribution passageway 108 at tool/spindle interface 28 without the need for separately hooking up hydraulic lines or other fluid connections. As will be understood, the tool 100 could also be utilized in conventional applications and dedicated operations as well.

One embodiment of a tool 100 will now be described with reference to FIGS. 1A, 2, and 9 to 11. The tool 100 can include a cutting reamer (e.g., head 101, which can be detachably chucked to a spindle 24. Cutting head 101 generally includes a proximal portion 104, a middle portion 106 and a cutting portion 107.

The tool 100 may comprise a body and is made of a rigid material (e.g., heat treated steel or the like) configured in a longitudinally extended generally cylindrical shape. The tool 100 can be of any desired length, however, it is preferably sufficiently long to accomplish the desired machining operation. A variety of standard materials available in the industry can be used to form the tool 100 so that it is sufficiently rigid and maintains its structural integrity in the desired form during the machining operations at rotational speed from about 200 to about 20,000 revolutions per minute, and so that adverse material deformation does not occur as fluid pressure in the hollow conduit or fluid distribution system 108 increases to levels from about 200 pounds per square inch ("psi") to about 1,000 psi ($1.38 \times 10^6$ $n/m^2$ to $6.89 \times 10^6$ $n/m^2$). Illustrative examples of materials which might be used include aluminum, steel, or the like. For example, an aluminum alloy might be used where there is a need for a lighter weight tool, which might be desirable when the tool 100 is interchanged in a machine spindle 24 using an automatic tool changing system.

The cutting portion 107 can include blade 126 and/or support pad 124. When the cutting head 101, is driven to rotate in the angular direction A about its longitudinal axis L by spindle 24, blade 126 can be used to drill, cut, ream, bore or otherwise machine an opening, cut-out or hole in a workpiece (e.g., 14), while support pad 124 helps to support the cutting head 101 within the hole being machined. More specifically, support pad 124 can rotate along the inner wall of the hole that is being machined by blade 126, in order to help maintain alignment between the longitudinal axis L of the cutting head 101 and the central axis of the hole, which is being machined by blade 126, despite the force which the physical interference between the workpiece (e.g., 14) and blade 126 exerts on the cutting head 101.

This support function of support pad 124 can be especially useful when the depth of the hole being bored is quite long relative to the diameter of the hole. The hole in the barrel of a gun is one example of this type of application. The support provided by support pad 124 can also be important in boring high precision holes, for example holes with close tolerances on diameter or cylindricity. Some examples of precision holes are cylindrical bores in engine blocks, spool valves, valve bodies, precision bores and connecting rods, and wrist pin bores.

Hollow conduit 108 can be provided within the body of tool 100 to extend or run along the longitudinal axis L in a predetermined arrangement, for example, from proximal portion 104 to the cutting portion 107. Both the tool 100 and the conduit 108 may be oriented so that they share the same center longitudinal axis of rotation. As will be better understood from the description herein, this coaxial orientation of the tool 100 and the conduit 108 may be provided so that the interchanging of tools made in accordance herewith (i.e., securing the tool 100 in place and establishing fluid communication between the spindle passage 26 and the hollow conduit 108) can be accomplished quickly and automatically upon attachment of tool 100, and to preserve balance in the tool 100 so that eccentricities, which could cause vibrations during use, are held to a minimum. In this regard, off-centered routing of hollow conduit 108 within the tool 100 could be employed, but in such exemplary embodiments, the tubes could be arranged symmetrically relative to the tool 100 to preserve balance during high speed tool rotation.

Forming the fluid distribution system 108 in the tool 100 and having fluid routed therethrough also provides an effective heat sink to dissipate thermal energy generated during machining operations, further minimizing undue thermal expansion. If the tool 100 were to undergo significant or uncontrolled thermal expansion, and particularly in a radial direction, the outer diameter of the tool mandrel 100 would increase and could interfere and hamper machining operations.

Referring back to FIG. 1, the work area 10 also includes a fluid supply system 11 that generally provides a source of pressurized fluid to be routed through the spindle 24 (via spindle passageway 26) and through tool 100 (via the fluid distribution system 108). The fluid supply system 11, often referred to as a through-spindle coolant or fluid system, also generally includes a compressor or other system (not shown) for pumping fluid at the desired pressure and flow rate. Various fluid supply systems could be used. For instance, each of the embodiments of the present invention may comprise or be connected to a fluid supply system of one of the types described in U.S. patent application Ser. No. 09/392,091 filed Sep. 8, 1999, which is herein incorporated by reference.

The spindle passage 26 has a distal end which can provide an automatically sealing interface with the tool 100 and fluid distribution system 108 at the tool/spindle interface 28. This seal might be provided in a variety of structural arrangements, including O-ring, seals and the like, and its exact structure may vary among particular applications.

Fluid communication can thereby automatically and immediately established and maintained between the spindle passageway 26 and fluid distribution passageway 108 when the tool 100 is engaged and held in place by the engaging assembly 25 using various assemblies and techniques known in the industry, as discussed previously. It should be noted that when the tool 100 is not engaged with the engaging assembly 25, mechanisms known in the industry (e.g., shut off valves or the like) can be used to terminate the flow of coolant fluid adjacent the end of the spindle passage 26.

Figure 1A:
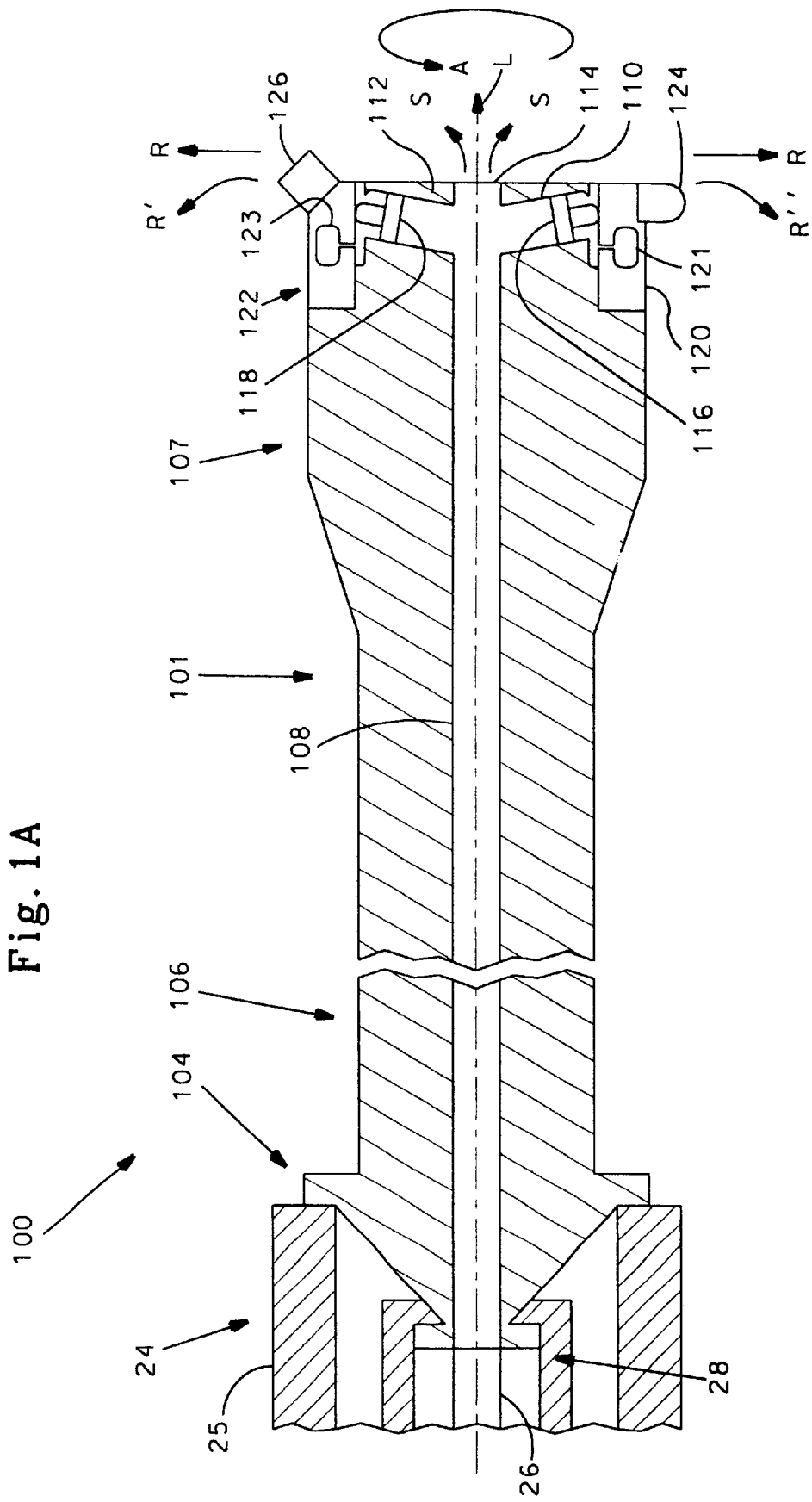
FIG. 1A is a cross-sectional view of a tool according to the present invention.

Conduit 108 can branch into a plurality of delivery conduits for assisting in delivering fluid to either the workpiece (e.g., 14) the blade 126 and/or the support pad 124. The delivery of cooling or lubricating fluid to the machining area can assist in the dissipation of thermal energy build up in the tool 100 and/or workpiece 14 (which resulted from machining operations), the lubrication of machining operations, and/or facilitate chip or particle removal. FIG. 1A illustrates delivery conduit including side conduits, such as support side conduit 110, blade side conduit 112, and/or exit conduit 114.

Fluid tight piston 116 can be provided, and can assist in metering or controlling, or even preventing pressurized fluid from escaping out of the cutting head 101 through the side conduits, such as support side conduit 110. Likewise, fluid tight piston 118 can assist in metering or controlling, or even preventing the pressurized fluid from escaping from the cutting head 101 through the blade side conduit 112. However, escape conduit 114 may allow pressurized cooling and lubricating fluid to escape from tool 100, so that the cooling and lubricating fluid splashes out of the cutting head 101 in the directions indicated by the arrows S. (As discussed below in connection with the embodiment exemplified in FIG. 7, in some embodiments of the present invention, the piston may allow fluid to leak around the blades and/or support members to help provide cooling and lubrication.)

The cooling and lubricating fluid which splashes out of escape conduit 114 (and also side conduits, as discussed above) serves to assist in cooling the tool 100 and workpiece 14 in order to help counter or dissipate heat build-up caused by the machining operation. The cooling and lubricating fluid also helps to lubricate the interface between support pad 124 and the inside wall of the hole being bored, so that support pad 124 moves more easily and smoothly along the inside walls of the hole, and also the interface between the blade 126 and the inside wall of the hole being bored, so that blade 126 moves more easily and smoothly along the inside walls of the hole. Conventional cooling and lubricating fluids, such as emulsified water or soluble coolant fluid, protein based water soluble coolant fluid, straight oil, mixtures thereof, or other available machining fluids can be used as the coolant fluid.

Blade side piston 118 may reside in blade side conduit 112. The pressurized cooling and lubricating fluid in the blade side conduit 112 assists in pushing blade side piston 118 generally radially outwardly against a lower part of blade cartridge 122. Because the blade cartridge 122 is provided with a slot 123, the lower part of blade cartridge 122 (and the attached blade 126) will move in the direction generally indicated by R' when pushed by blade side piston 118.

In this way, unlike many conventional tools, the blade cartridge 122 and blade 126 are selectively biased in the radial direction, with the amount of bias being determined by the fluid pressure in blade side conduit 112. The fluid pressure in blade side conduit 112 is primarily determined by how fast fluid is pumped into the hollow conduit 108 by the pump (P) which supplies fluid from supply 11 to conduit 108. Therefore, the bias or position of blade 126 can be controlled by controlling the speed and pressure of the pump P.

Figure 9:
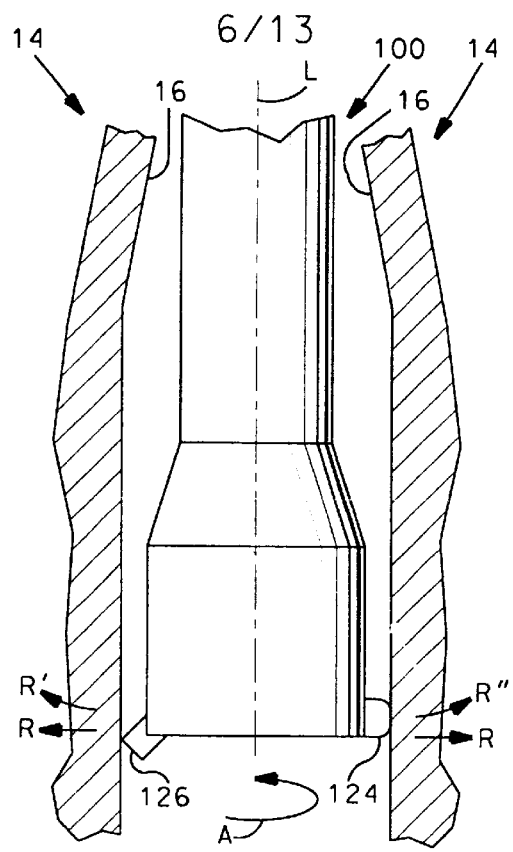
FIG. 9 shows the tool boring a hole in a workpiece.
Figure 10:
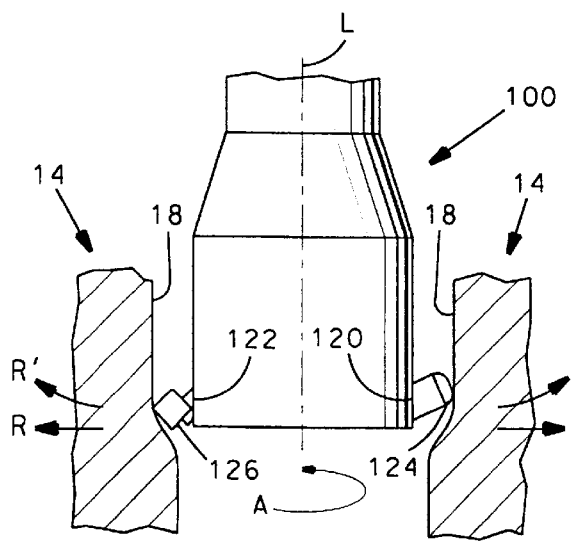
FIG. 10 shows the tool boring a hole in a workpiece.

More particularly, when the fluid in blade side conduit 112 is at a relatively high pressure, this high pressure will serve to push blade side piston 118 and the blade 126 relatively far out in the direction R'. (An example of this is shown in FIG. 10.) On the other hand, when the fluid pressure in the blade side conduit 112 is relatively low, the blade side piston 118 and the blade 126 will be pushed in the direction R' to a lesser extent, if at all. (An example of this is shown in FIG. 9)

In either case, the location of the blade 126 with respect to the R' direction will be determined by the balance between the fluid pressure pushing in the R' direction, the forces pushing in the counter R' direction, and/or the centrifical force generated by rotation of tool 100. Specifically, the spring force of the slotted blade cartridge 122 and the force exerted by the workpiece on blade 126 will tend to push the blade 126 in the counter R' direction.

If the spring force of blade cartridge 122 and the amount of counter R' force exerted on blade 126 by the workpiece remains fairly constant, then the location of the blade in the R' direction can be selected and controlled by controlling the bias, which can be accomplished by controlling the fluid pressure in blade side conduit 112 and/or rotational speed of the tool 100. As such, the fluid pressure in blade side conduit 112 can be selected to determine the radius of the hole being machined and/or selected to compensate for wear of the blade 126 since the displacement direction R' of the blade 126 is substantially the same as the radial direction R, at least over the limited travel range of blade 126.

Support pad 124 can be mounted on support cartridge 120, and may include a slot 121 that can permit the lower part of the blade cartridge 120 and the support pad 124 some range of travel in the R" direction (which is substantially the same as the radial direction R for the limited range of travel allowed by support cartridge 120). Fluid pressure in support side conduit 110 tends to push support side piston 116 against the lower part of support cartridge 120, thereby working to bias support pad 124 in the R" direction. Therefore, the support pad 124 can be selectively biased in a manner similar to the blade member 126. Alternatively, a blade, similar to blade 126, can be mounted on support cartridge 120. A second blade can assist in supporting tool 100, and can assist in removing material from workpiece 14.

The spring force of support cartridge 120 and normal forces exerted by the workpiece (e.g., 14) on support pad 124 will tend to push back in the counter R" direction. The location of support pad 124 in the R" direction will therefore be determined by the balance of these forces. By controlling the bias of the support pad 124, its location can be controlled during machining operations.

Tool 100 can compensate to some degree for differences in wear between blade 126 and support pad 124. In use, both blade 126 and support pad 124 will wear to some extent due to physical interference between these parts 124 and 126, respectively, and any workpiece (e.g., 14). Generally, blade 126 will wear faster than support pad 124 because blade 126 actually does the machining of workpieces (e.g., 14). Of course, in a conventional reamer, if the blade member wears faster than the support member(s), then the diameter and/or the alignment of the holes cut by the conventional reamer will generally be adversely affected.

However, if tool 100 is a reaming tool and if the blade 126 loses material through wear, then the biasing fluid pressure in blade side conduit 112 will tend to push blade 126 further out in the R' direction in order to compensate for this wear to some extent, and to maintain blade 126 at an appropriate radial location. Similarly, if support pad 124 loses material through wear then the biasing fluid pressure in support side conduit 110 will likewise push support pad 124 out further in the R" direction in order to compensate for the support side wear to some extent. Not only does this feature of the present invention help enhance hole precision and alignment, it also may allow more prolonged use of blades and/or support members by effectively compensating for an increased degree of wear.

Turning now to FIGS. 9 and 10, tool 100 of the present invention can be used to machine (e.g., ream) holes of different or varying diameters. In FIG. 9, the biasing fluid pressure in conduit 108, blade side conduit 112 and support side conduit 110 is maintained at a relatively low level so that the blade 126 and the support pad 124 are not pushed out very far in the R' and R" directions, respectively. Under these conditions, a hole machined by tool 100 will have a relatively small diameter.

However, by increasing the biasing fluid pressure in the conduits 108, 110 and 112, as shown in FIG. 10, the blade 126 and support pad 124 will be pushed further out in the R' and R" directions, respectively. This can result in a relatively larger diameter hole. No change in the tool hardware is necessary to accomplish this, rather only the pressure of the supply fluid must be adjusted. Of course, it is generally easier to control the pressure of the cooling and lubricating fluid (by controlling speed and/or pressure of a pump) than it is to change hardware, so the tool 100 according to the present invention objective will generally increase efficiency and productivity in applications which require holes of different diameters.

Also, although the blade 126 and support pad 124 have a limited range of travel and an accordingly limited range of possible hole diameters, fewer tool cutting heads (e.g., 101) will generally be necessary for a given application compared to tool heads, which are capable of machining only one hole diameter.

The relative range of travel between the blade 126 and the support pad 124 can vary according to the particular application. For example, finishing tools can have a relative range of adjustment to allow the machining diameter to vary around 250 microns. Roughing tools may have a larger range of adjustment to allow the machining diameter to vary around 500–1000 microns. The greater amount of adjustment for roughing tools is desirable due to the relatively high level of wear experienced by the tool and is permitted since a lower level of precision is necessary during roughing procedures.

Figure 11:
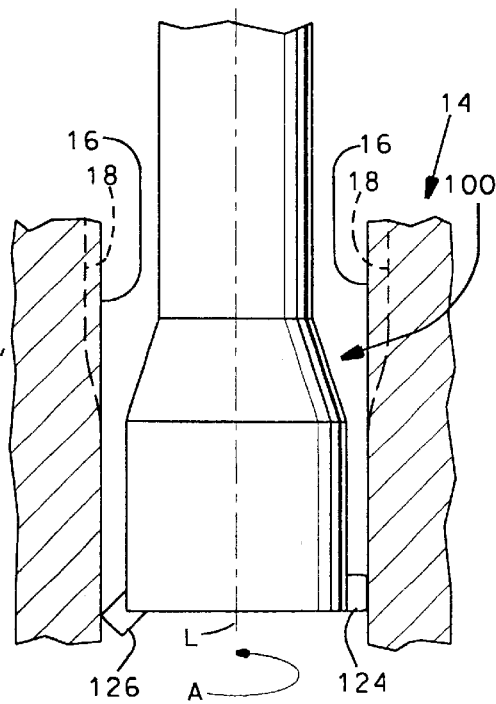
FIG. 11 shows the tool boring a hole in a workpiece.

Turning now to FIGS. 9–11, tool 100 can be used to compensate for material deformation in the workpiece. FIG. 9 exemplified a hole being machined in workpiece 14 by tool 100. In the machining operation exemplified by FIG. 9, the fluid pressure in conduits 108, 110, 112 and the radial location of blade 126 and support pad 124 are maintained at a generally constant value. Under these conditions, workpiece 14 will generally bow inward near the top of the hole at the location denoted by reference numeral 16, due to material properties inherently present in workpiece 14.

As exemplified in FIGS. 10 and 11, compensation for this phenomenon can be effected by tool 100. When tool 100 is reaming the top of the hole, the biasing fluid pressure in conduits 108, 110, 112 is adjusted so that blade 126 and support pad 124 are pushed out a bit further in the radial direction R. At first, this results in the hole diameter being somewhat larger at the top of the hole as denoted by reference numeral 18. Then, as shown in FIG. 11, as the tool 100 machines (e.g., reams) further down into the workpiece 14, the biasing pressure in conduits 108, 110, 112 is gradually decreased so that the blade 126 and support pad 124 gradually retract to some degree to match the nominal diameter of the hole being machined as the tool 100 moves further down into the workpiece 14. While this is occurring, the top of the hole 16 will spring back to some degree to occupy the position denoted by reference 18. In this way, the top of the hole can take on the nominal hole diameter, because it was machined out to a somewhat larger diameter.

Of course, in order to accomplish the machining operation shown in FIGS. 10 and 11, the fluid pressure must be continually and carefully controlled with respect to the longitudinal location of the tool 100 within the workpiece 14. Appropriate control of the fluid pressure can be empirically determined and written into software which controls the tool 100. On a related note, tool 100 can be also used to machine holes in a workpiece 14 which do not have a constant diameter over or along their entire length. The fluid pressure can be controlled as the machining occurs so that various portions of the hole have larger or smaller diameters as desired. For example, tool 100 can be used to both ream a hole and provide a facing for the hole or a counter sink for the hole at the front and/or back of the workpiece 14.

Another embodiment of a tool 200 according to the present invention is exemplified in FIGS. 3 and 4. In tool 200, hollow conduit 208, blade side conduit 212, escape conduit 214, blade side piston 218, blade side cartridge 222 and blade 226 are similar to the corresponding elements of tool 100. Support members 230 and 232, respectively, are provided, mounted or otherwise affixed along the cutting portion 207 of tool 200 in a manner similar to that found in conventional tools.

While tool 200 does not provide all of the flexibility of the previously-discussed biased support pad embodiment exemplified in tool 100, it is somewhat simpler in construction and may be appropriate for applications which do not cause much wear on support members 230 and 232, respectively. In tool 200, however, wear on the blade 226 can still be effectively compensated by appropriate adjustment of the fluid pressure in conduits 208, and 212, respectively.

Figure 5:
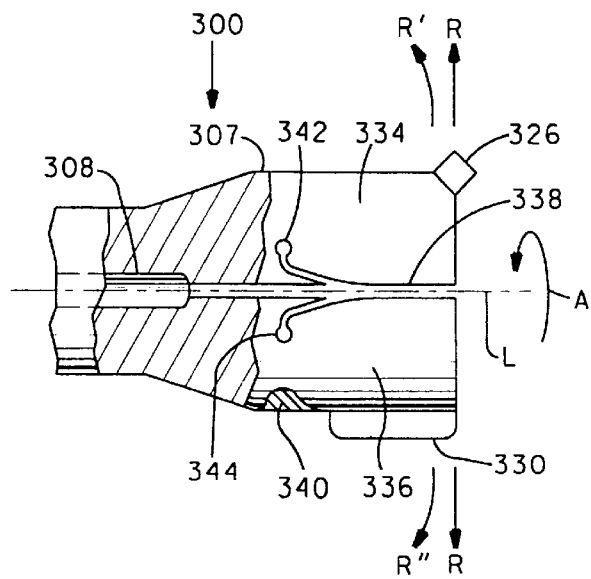
FIG. 5 is a partial cross-sectional view of an alternative embodiment of a tool according to the present invention.
Figure 6:
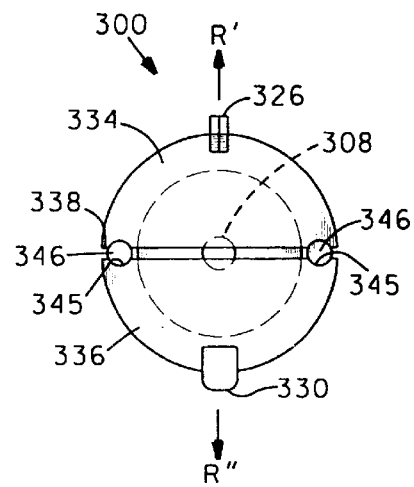
FIG. 6 is an end view of the tool of FIG. 5.

Another alternative embodiment of a tool 300 according to the present invention is exemplified by FIGS. 5 and 6. In tool 300, a central conduit 308 can be provided and extends along the tool 300 to the cutting portion 307 where it terminates in fluid communication with a slot 338 disposed across the cutting portion 307. Blade 326 can be provided on one side of the slot 338, while support member 330 can be provided on the opposite side of slot 338 (e.g., FIG. 6). The portion of the cutting portion 307 which includes blade 326 is called blade side 334. The other portion of the cutting portion 307 having support member 330 affixed thereto is called support side 336.

As with all of the exemplary embodiments having a slotted cutting or working portion, the slot may have many thicknesses and shapes in order to divide the working portion into two or more sections. In some exemplary examples, the slot may have a small thickness (e.g., 0.01 inches wide). The slot can be created by many exemplary processes. For instance, the slot could be created by a wire EDM process, a slotting saw, milling, or other process.

It will be appreciated that thicknesses of larger or smaller than 0.01 inches could also be used. A slot with a smaller thickness may be desirable to minimize fluid loss during use of the tool while a slot with a larger thickness can be used in situations where a predetermined amount of fluid loss is desirable (e.g., in situations where additional cooling, lubrication, and/or chip removal, etc., is desired).

In operation, cooling and lubricating fluid can be pumped down conduit 308 and into slot 338. Depending on the pressure of the fluid, blade side 334 and support side 336 will be biased away from each other to a greater or lesser extent. More specifically, blade side 334 will be biased in the R' direction by the fluid pressure, while support side 336 will be biased in the R" direction by the fluid pressure. This, in turn, causes the blade 326 and the support member 330 to be pushed in the R' and R" directions, respectively, thereby allowing control of the radial positions of the blade 326 and support member 330. In this way, the radial position of the blade member 326 and support member 330 can be controlled by controlling fluid pressure in the conduit 308 and slot 338.

Figure 12:
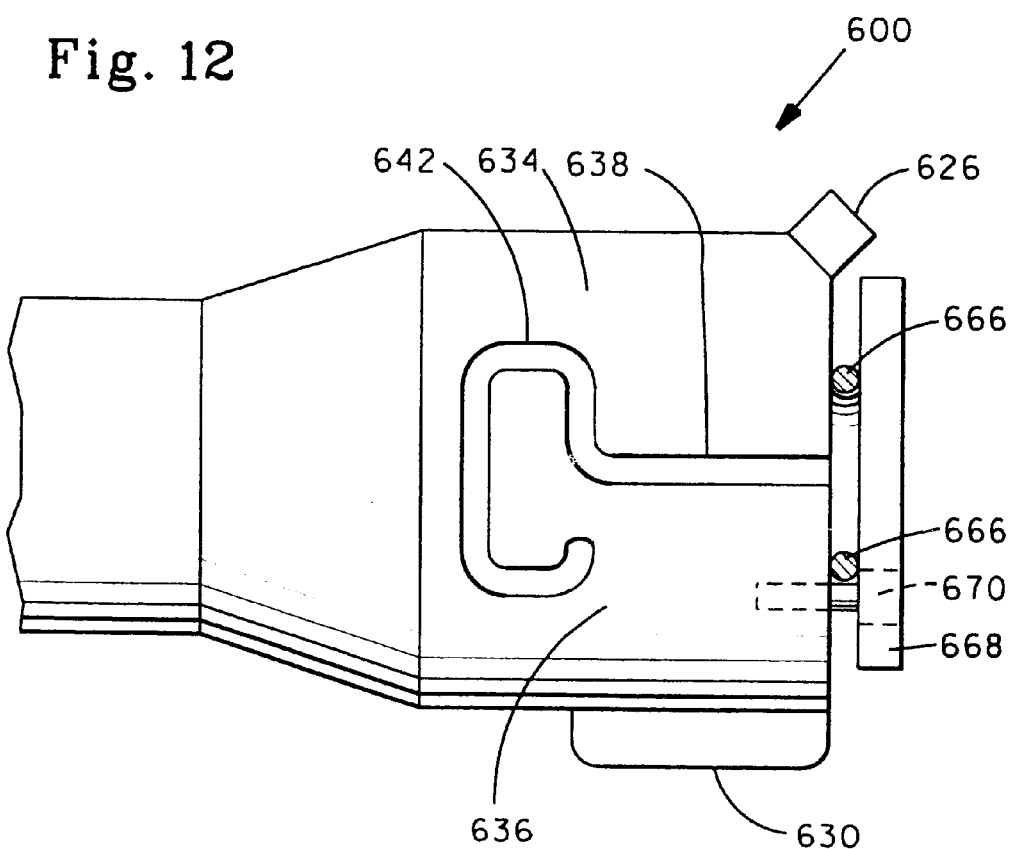
FIG. 12 shows an embodiment of a tool with strain relief.

In tool 300, an area of removed material 340 in the body of tool 300 helps to allow relative radial deflection of the sides 334 and 336, respectively. Also generally J-shaped slots 342 and 344, respectively help allow the sides 334 and 336, respectively to separate in the radial direction (e.g., R' and/or R") under the influence of cooling fluid pressure. A slight modification of this embodiment is exemplified in FIG. 12. FIG. 12 illustrates head 600 with blade 626 and support pad 630. Slot 638 can include an alternative configuration, and/or can include a strain relief portion 642 to help provide strain relief of tool 600 in use. As will be appreciated by those skilled in the industry, other shapes and configurations of slots (e.g., 338) can be provided in the body of tool 300 in keeping with the teachings and scope of the present invention.

The tool 300 may also include a seal along the longitudinal edges thereof to minimize coolant loss out of the tool 300, to assist in selectively biasing the tool 300, and to assist in directing fluid toward the end of cutting portion 307 of the tool 300. In one embodiment, tool 300 may be provided with bore holes 345 in the body of tool 300 generally along the longitudinal length thereof and positioned toward the edge thereof. Holes 345 can be filled or plugged with a corresponding shaped plug (e.g., generally longitudinally extending) 346 to effectively seal the slots 338 along their respective edges.

Furthermore, a seal 666 (such as an o-ring) and an end cap 668 may be provided on and releasably attached to the end of tool 600 to further assist in creating a pressure chamber within the tool 600 for selectively biasing the blade 626 and/or support 630 (which also can be another cutter or blade) radially outwardly for desired machining operations. So that tool 600 can be biased as desired, exemplary embodiments of the present invention may include an end cap 668 attached with at fastener 670 at one location to either the blade side 634 or the support side 636 of the tool 600. It will further be appreciated that the end cap 668 could be attached in both locations, with at least one of the locations having a slot or other mechanism to allow the fastener to side relative to the end plate as the blade side 634 and support side 636 expand relative to one another. The fastener may be a screw, bolt, or other suitable attachment means known in the machine industry.

Figure 5A:
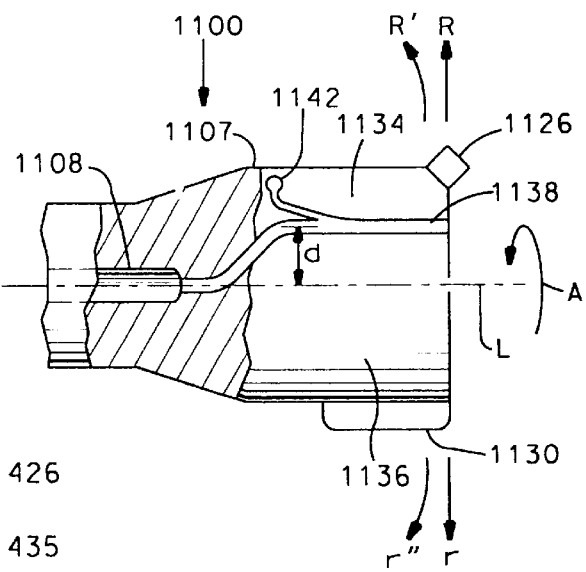
FIG. 5A is a partial cross-sectional view of another alternative embodiment of a tool according to the present invention.

Another alternative exemplary embodiment of a tool 1100 according to the present invention is exemplified in FIG. 5A. The tool 1100 is similar in construction to tool 300 described in relation of FIGS. 5 and 6 above and contains the same corresponding parts and operates in a similar manner. For instance, although not shown, it will be understood that tool 1100 includes bore holes and plugs similar to the bore holes 345 and the plugs 346 as illustrated in FIG. 6. Furthermore, although not shown, the tool 1100 may also include a seal and end cap, such as seal 666 and end cap 668 described in relation of FIGS. 5 and 6 above. In tool 1100, a central conduit 1108 can be provided to extend along the tool 1100 to a working portion 1107. The working portion 1107 is the portion of the tool adapted to remove material from the workpiece. The central conduit 1108 is in fluid communication with slot 1138 disposed along the working portion 1107.

As depicted in FIG. 5A, the slot 1138 is illustrated as being offset a predetermined distance D from the axis L according to the particular application as desired. For instance, the slot 1138 might extend substantially within the blade side 1134 of the working portion 1107, thereby bifurcating the working portion 1107 into sections with different cross sectional areas. Bifurcating the working portion 1107 in this manner allows the blade 1126 to be biased in the R' direction a relatively greater distance than the support member 1130 travels in the r" direction upon pressurization. Biasing the blade side 1134 a greater distance than the support side may better compensate for the greater wear experienced by the working member 1126. As the working member 1126 wears away during use, the blade side 1134 can more easily bias outward to compensate for the worn away portions of the working member 1126. In contrast, the support member 1130 can remain relatively stationary which may be desirable due to the high wear resistance of the support member 1130.

A J-shaped slot 342A can extend upwardly in the side containing the blade in order to permit further extension of the blade in the R' direction while reducing stress concentrations. Although not shown, it is understood that an additional J-shaped member, such as J-shaped member 344 illustrated in FIG. 5, could be provided within the tool 1100 in order to permit further extension of the support member 1130 in the r" direction and/or to reduce stress concentrations. In addition, although not shown, the slot 1142 could extend substantially in the support side 1136 rather than the blade side 1134 in order to cause the support member 1130 to travel a larger distance than the blade 1126.

In an exemplary operation therefore, fluid (e.g., cooling and lubricating fluid) can be pumped down the conduit 1108 and into the slot 1138. As depicted in the embodiment illustrated in FIG. 5A, depending on the pressure of the fluid, the blade side 1134 will be biased away from the support side 1136 in the direction R'. The support side 1136 will be biased to a smaller extent, if at all, in the direction r". In this manner the fluid pressure acts to allow control of the radial position of the blade 1126 relative to the support side 1136. As with the other embodiments of the invention, the support member 1130 could comprise another blade 326 or a plurality of blades and/or supports. Although not shown, it is understood that the slot of the other exemplary embodiments described herein could also be offset from its axis according to the particular application as desired.

The various slotted embodiments of the present invention could be provided with one or more seals and may even be designed without a seal. Embodiments including a seal can be used to restrict, or prevent, fluid flow from the tool. For example, one or more seals could be used to restrict, or prevent, fluid flow from the side(s) and/or end of the tool. For instance, the embodiment illustrated in FIGS. 5 and 6 illustrate at least one seal (i.e., plugs 346) used to restrict, or prevent, fluid flow from the side of the slot 338. In this instance, fluid may be substantially prevented through the sides of the tool while being permitted through the end of the tool. The fluid could further be restricted or prevented with an end cap and/or seal as described in relation to many of the following exemplary embodiments of slotted tools. It will further be understood that the end cap and/or seal could be provided without sealing the sides (e.g., with plugs). Allowing a predetermined amount of fluid might be desirable for lubrication, heat reduction and chip removal. Limiting the fluid flow might further be required to enable the tool to bias the working member or blade outwardly.

The slotted tools of the described examplary embodiments might also be provided without any seals as long as the tool is configured to allow pressure build up to allow proper biasing of the working member or blade and/or support member, if provided. For example, the slot geometry (e.g., a slot with an irregular geometry) could be used to interfere with, and therefore restrict fluid flow. Moreover, the slot thickness could be further reduced to the point where the seals would not be necessary.

Figure 5B:
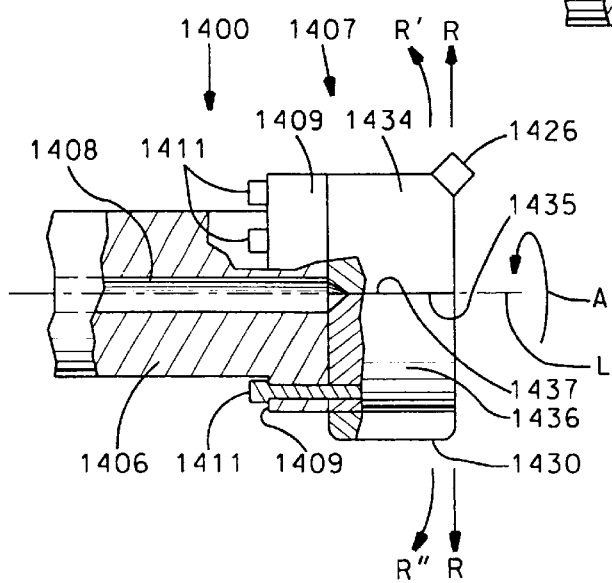
FIG. 5B is a partial cross-sectional view of yet another alternative embodiment of a tool according to the present invention.

FIG. 5B depicts a tool that can function without any sealing members. The tool is fabricated with little, if any, clearance between the first side 1434 and the second side 1436 of the working portion 1407. As shown in FIG. 5B, the first side 1434 and second side 1436 are fabricated separately and then fastened to the shank 1406. For instance, a plurality of fasteners 1411 may be used to connect the first side 1434 and the second side 1436 to a shoulder 1409 of the shank. It will be understood that other methods could be used to attach the first and second sides to the shank such as welding, brazing, etc. Accordingly, the first side 1434 and second side 1436 are arranged such that there is little or no clearance between the side surface 1435 of the first side 1434 and the side surface 1437 of the second side 1436. In one embodiment, the first side surface 1435 abuts the second side surface 1437.

In use, pressurized fluid is introduced through conduit 1408 such that it travels to the working portion 1407. The pressure causes a predetermined biasing of the first side 1434 and working member 1426 attached thereto, relative to the second side 1436 and support member 1430 attached thereto. The pressure can be changed to vary the effective diameter of the tool 1400. As with all of the embodiments of the present invention, the support member 1430, if provided, can be replaced with one or more support members and/or working members or blades.

Yet another embodiment of a tool 400 is exemplified in FIG. 7. In exemplary tool 400, conduit 408 extends along the center of the tool 400 to side conduits, e.g., support side conduit 410 and/or blade side conduit 412. The fluid in support side conduit 410 will push on and bias support pad 424 in the radial direction R. Similarly, fluid pressure in blade side conduit 412 will push on and bias blade cartridge 422 and blade 426 in the radial direction R. In this way, fluid pressure can be used to control the radial location of the blade 426 and support pad 424. A stop 425 should be provided to ensure that the blade cartridge 422 and/or support pad 424 included in the cutting portion 407 are not pushed entirely out of the head by the fluid pressure.

In tool 400, some clearance (e.g., 427A) can be provided between support pad 424 and support side conduit 410 so that cooling and lubricating fluid can splash out in the directions indicated by the arrows S. Similarly, clearance (e.g., 427B) can be also provided between the blade cartridge 422 and the blade side conduit 412 so that cooling and lubricating fluid may splash out in the direction indicated by the arrow S. Alternatively, the support pad 424 and blade cartridge 422 may be constructed as fluid-tight pistons so that fluid escaping is minimized or eliminated to the outside of tool 400. Under this alternative, the fluid would be used solely for the purpose of biasing blade 426 and/or support pad 424.

Another embodiment of a tool 500 according to the present invention will now be described with reference to FIG. 8. In this embodiment, the blade 526 and support member 530 can be biased in the R' and R" directions, respectively, by spring 540 which is located within slot 538 in the cutting portion 507 of tool 500. Spring 540 is chosen so that its spring force provides an appropriate amount of biasing force on the blade 526 and support member 530. The spring 540 can be removed and replaced with other springs having other characteristics depending on the desired application. In this way, tool 500 can be used to machine holes of different diameters. For example, a longer spring or a stiffer spring will push out blade 526 and support member 530 further in the R' and R" directions, respectively, resulting in a larger diameter hole. Also, springs 540 can be selected to compensate for wear and tear of the blade 526 and/or support member 530. For example, a longer or stiffer spring 540 can compensate for a worn blade 526 and/or support member 530.

It is noted that the biasing force on the blades (e.g., 126) and/or support members (e.g., 130) of tools according to the present invention can be at least one order of magnitude higher than the cutting load or the load caused by friction from the workpiece (e.g., 14). In embodiments using fluid pressure, a high bias can be effected by making the active area of the piston (e.g., interface between the fluid and the piston) as large as possible.

It is also noted that support members of tools according to the present invention may be shaped identically to the blade member. For example, if a reamer head is configured to have three "blades" around its circumference, generally the "blade" which protrudes a small amount farther in the radial direction will act as a blade by performing most of the material removal. The other two "blades" will not remove a substantial amount of material and can act instead as support members. In still further examples, a plurality or all of the blades could be arranged to protrude outwardly such that they all remove material while each blade also acts as a support member for the remaining blades.

Figure 13:
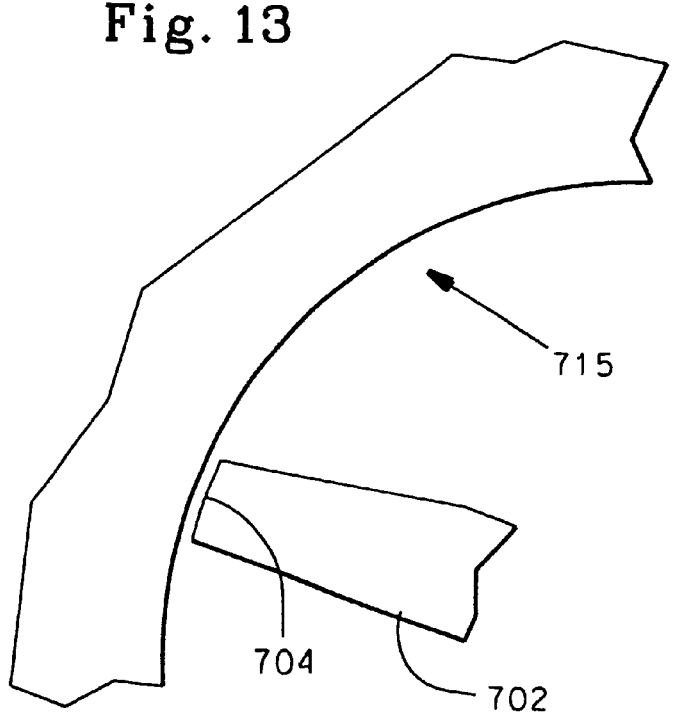
FIG. 13 shows a portion of a blade of the tool which acts as a support member due to its wide cylindrical margin.

Another way to help ensure that a member having a "blade" geometry will act as a support member rather than a blade is to use a blade with a relatively wide cylindrical margin relative to the diameter of the bore. This is shown in FIG. 13, where blade 702 has a wide cylindrical margin 704 relative to bore 715. Due to its wide margin, blade 702 does not remove substantially any material from the workpiece 14 and acts a support member, rather than as a blade.

In still further examples, the blade 702 can be arranged to remove a substantial amount of material while also acting as a supporting member for cutting material.

Turning now to FIGS. 14–17, the present invention can also include a chip evacuation chamber 852 in the body of a tool for assisting in removing cut particles and/or chips from the machining area in a hole, and from interfering with further machining operations, especially in blind holes. Chamber 852 includes at least inlet 854 adjacent the cutting portion 807, a corresponding outlet 858 positioned proximally away from the inlet 854, such as along the middle portion 806 and/or proximal portion 804, and a corresponding passageway 856 between inlet 854 and outlet 858. The chamber 852 can also have a larger diameter when machining an aluminum workpiece since the cut particles tend to ball up, and could easily interfere with particle removal or clog the inlet 854, outlet 858, and/or passageway 856.

One or more blade cartridges 822 and/or support cartridges (see, e.g., FIG. 17) can each be mounted or attached to tool 800 within chamber 852 using techniques and equipment known in the machine tool industry. When more than one blade cartridge and blade 826 are used, they can be arranged so that the cut radius of each varies. For example, one of the blade (e.g., 826A) may machine the inner portion of a hole whereas the other blade (826B) may machine the outer portion of the hole. As will be appreciated by those skilled in the art, there should be some slight overlap between blades 826A and 826B, respectively, so that the hole is machined appropriately, especially in drilling operations. As exemplified in FIG. 16, when blade cartridge 822 has an extended longitudinal length, which may be need for stability and support in machining operation, the shaft 822A of cartridge 822 may be tapered to assist in providing for chip removal through chip removal passageway 852.

The tool 800 may also include a seal (e.g., plug 846) along the longitudinal edges (e.g., within holes 845 extending along the edges) thereof to minimize coolant loss out of the tool 800, to assist in selectively biasing the tool 800, and to assist in directing fluid toward the end of cutting portion 807 of the tool 800. In one embodiment, as shown in FIG. 14, tool 800 may be provided with bore holes 845 in the body of tool 800 generally along the longitudinal length thereof and positioned toward the edge thereof. Holes 845 can be filled or plugged with a corresponding shaped plug 846 (e.g., generally longitudinally extending) to effectively seal the slots 838 along their respective outer longitudinal edges. As with other exemplary embodiments having plugs, an end cap may also be provided to help secure the plugs in place.

Figure 18:
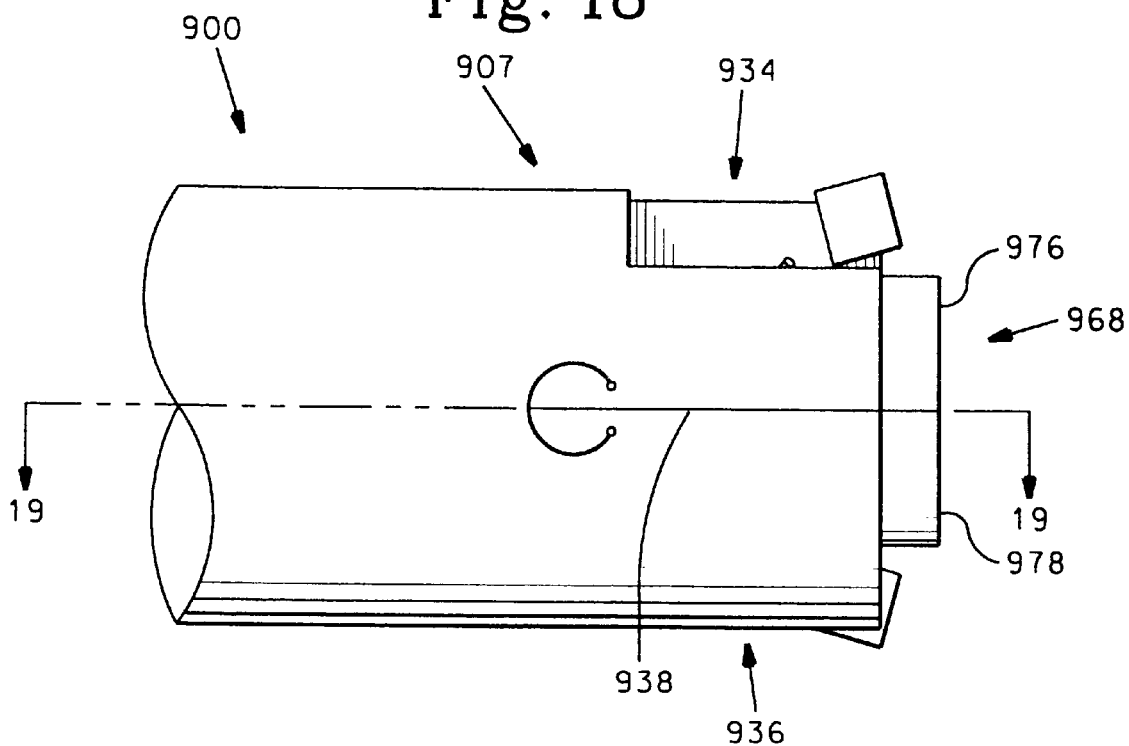
FIG. 18 is a partial view of a tool with a jacket in accordance with another embodiment of the present invention.
Figure 19:
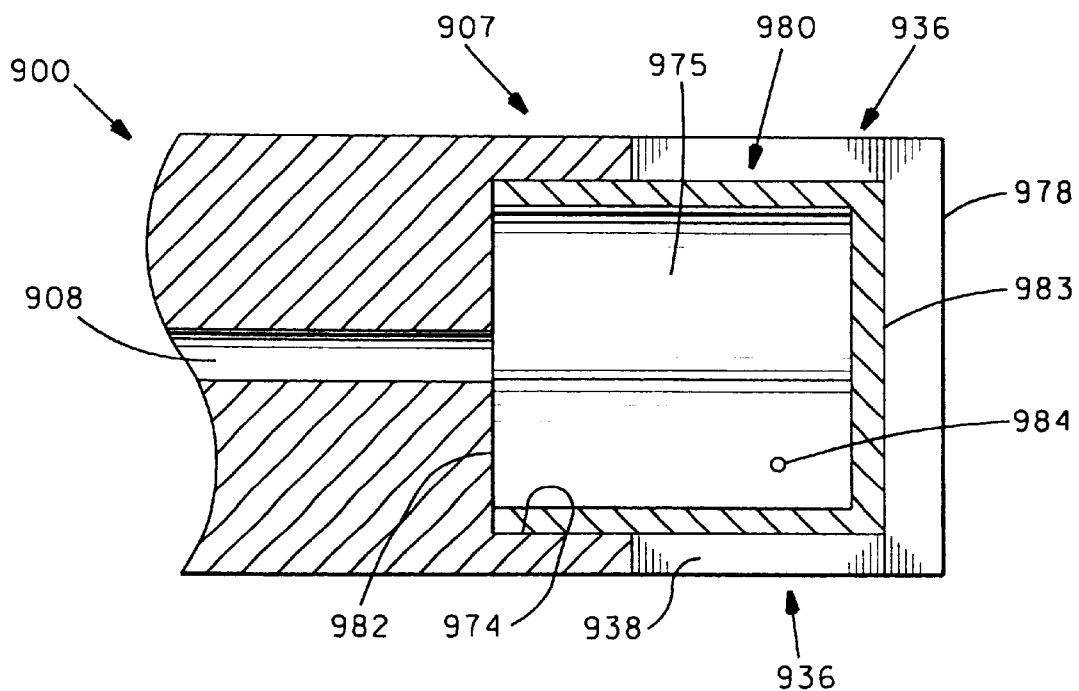
FIG. 19 is a partial sectional view taken along line 19—19 of the tool of FIG. 18.
Figure 20:
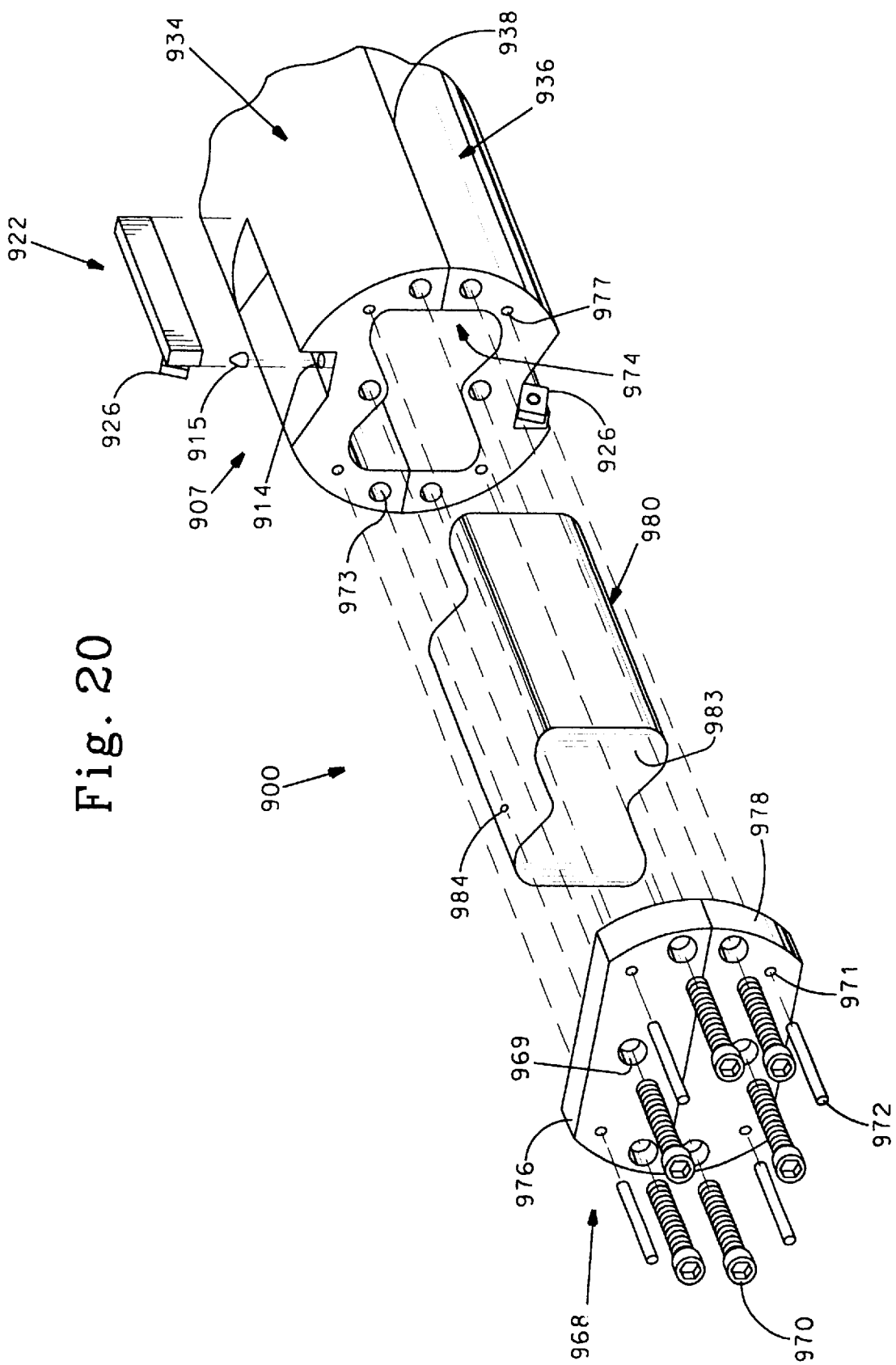
FIG. 20 is a partial exploded perspective view of the tool of FIG. 18.

Another alternative embodiment of the tool 900 is illustrated in FIGS. 18–20. A central conduit 908, as best seen in FIG. 19, can be provided to extend along the tool 900 to a working portion 907. As illustrated in FIG. 18, the working portion 907 of the tool 900 is bifurcated with a slot 938 extending laterally through the sidewall. The embodiment of tool 900 includes a seal 980, such as a jacket, or bladder, with an at least partially open end 982 facing the conduit 908 and a closed end 983 facing away from the conduit 908. The jacket 980 is positioned within a cavity 974 defined in the working portion 907 of the tool 900. The jacket 980 acts to at least partially form or sealingly define a pressure chamber 975 and is adapted to restrict, or substantially prevent, fluid from traveling outwardly through the slot 938. An end cap 968, having a first section 976 and a second section 978 are shown as being secured with fasteners (see 970 in FIG. 20) to the cutting portion 907 of the tool 900 in order maintain the jacket 980 within the cavity 974 while allowing selective radial flexing of the first side 934 and the second side 936 of the tool 900 to adjust the effective working diameter of the tool in use.

The jacket 980 may include one or more apertures 984 for communicating with one or more corresponding escape conduits or passages 914 defined in the cutting portion 907 to allow fluid to pass therethrough and be dispensed by a nozzle 915 for lubrication, heat reduction, and/or chip removal adjacent the corresponding working member or blade 926. As with any of the other embodiments of the invention described herein, the working member or blade may comprise a cutting edge (e.g., see the edge of the working member 926). In addition, the working member or blade may comprise an abrasion surface, or other member adapted to remove material from a workpiece by cutting, grinding, reaming, boring or other mechanical method. Moreover, the working member or blade may be replaced by one or more support members, such as support member 330 depicted in FIG. 5.

The jacket 980 can be comprised of flexible materials such as plastic and may be impermeable to the pressurized fluid. In other embodiments, the jacket 980 might be comprised of a material that is at least partially permeable to the fluid, such as a fluid permeable membrane, to provide sufficient resistance to fluid flow in order to allow pressurization of the pressure chamber 975 while allowing predetermined limited seepage of fluid laterally through the slots 938 and/or through the escape conduit or passage 914 for lubrication, cleaning, cooling, etc. In still further embodiments, the jacket 980 could be perforated with a plurality of small apertures that restrict, rather than prevent, fluid flow. With a fluid permeable material or fluid restricting structure, the aperture 984 in the jacket 980 may be smaller or nonexistent wherein a restricted amount of fluid may escape through the escape conduit or passage 914 is a result of the permeably of the material and/or the permeable structure of the jacket 980.

In one exemplary embodiment, the jacket 980 could comprise nylon, such as DELRIN nylon, to act as a pressurized jacket or bladder as shown in the figures, especially FIG. 20. In still other examples, the jacket can comprise a material having comparable modulus and strength of DELRIN nylon. In still further examples, it is understood that the jacket can alternatively comprise a material having a different modulus and strength than that of DELRIN nylon. Indeed, it will be appreciated that a wide range of material will be acceptable to create the jacket of the present invention as long as the modulus is less than the material of the working portion to allow the jacket to expand, and thereby radially flex the sides of the working portion. In addition, it is understood that the jackets of the present invention may be adapted to allow transmission and communication of fluid to the escape conduit or passage 914 and/or the slot 938.

The jacket 980, as shown in FIG. 20, may have a generally hour-glass shape corresponding to the conformation of the cavity 974. The hour-glass shape allows the jacket 980 to accommodate a maximum area in the cavity 974 while still allowing for apertures 973 to be formed in the working portion 907. Moreover, the non-circular shape simplifies alignment of the jacket aperture 984 with the escape conduit or passage 914, if provided.

FIG. 20, illustrates an exploded perspective view of the tool 900 in accordance with one embodiment of the present invention. To assemble the tool 900, the jacket 980 is inserted within the cavity 974 with the closed end 983 facing outwardly and with the aperture 984, if provided, in communication with the escape conduit or passage 914 of the working portion 907. The first and second sections 976, 978 of the end cap 968 are placed over the end of the working portion 907 such that aligning dowels 972 are received in corresponding ones of apertures 971 formed in the end cap 968 and through corresponding ones of the apertures 977 formed in the working portion 907. Next, the end sections 976, 978 are fastened to the working portion 907, for instance with fasteners 970. Fasteners 970 are received within apertures 969 formed in the end cap and through threaded tapped holes 973 formed in the working portion 907. The apertures 969 may be counter sunk in order to recess the heads of the fastener 970. Blade cartridges 922 with corresponding blades 926 are fastened to the working portion 907.

Although the slot 938 is illustrated as extending along the central plane of the cutting tool 900, it is understood that the slot 938 may be offset as illustrated in, for example, FIG. 5A to allow one of the blades to bias outwardly farther than another blade. In addition, as with all the embodiments of the present invention, the cutter blade could take the form of a singular cutter edge or could be provided with rough working surface for removing material from the interior portion of the workpiece.

Figure 21:
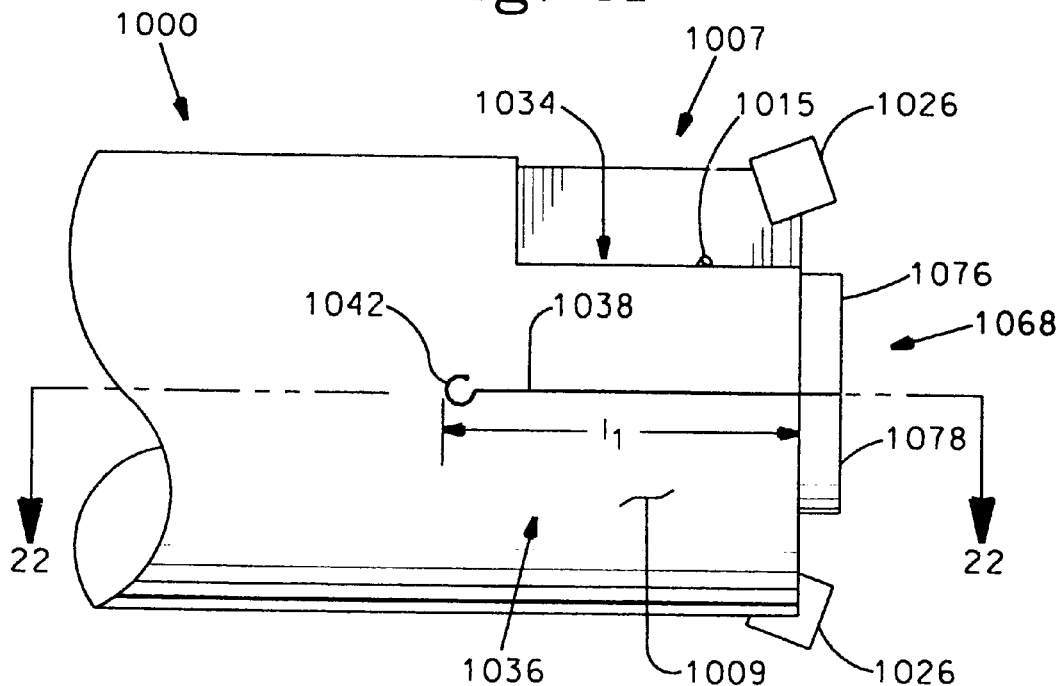
FIG. 21 is a partial view of a tool with an elongated end seal in accordance with yet another embodiment of the present invention.
Figure 22:
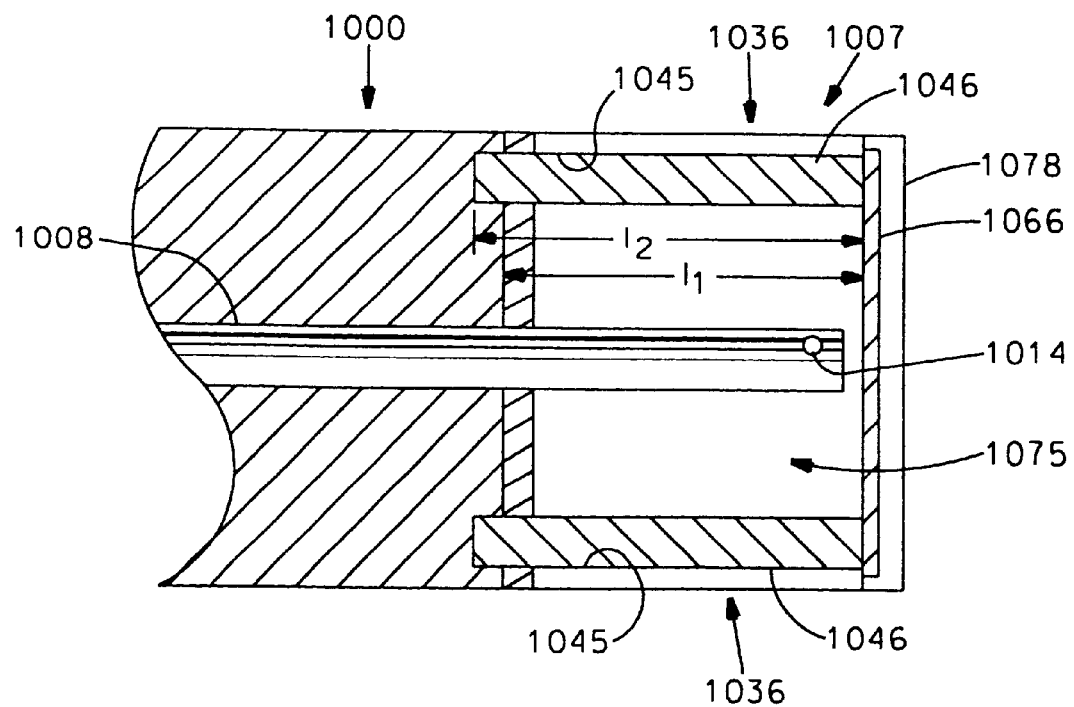
FIG. 22 is a sectional view taken along line 22—22 of the tool of FIG. 21.

Another exemplary tool 1000 of the present invention is depicted in FIGS. 21–23. FIG. 21 is a partial view of a tool 1000 with a bifurcated end having a slot 1038 extending laterally through the cutting portion 1007. The tool 1000 includes at least one seal (e.g., plugs 1046 and elongated end seal 1066 as best seen in FIGS. 22 and 23) adapted to restrict or prevent fluid flow through the side surface 1009 and the end surface 1013 of the working portion 1007.

FIG. 22 is a sectional view of along line 22 of FIG. 21 and illustrates plugs 1046 inserted into holes 1045 that extend within the cutting portion 1007 at a depth $I_2$ that is larger than the depth $I_1$ of the slot 1038 to help slow or prevent fluid flow through the lateral slot 1038. As illustrated in FIGS. 22 and 23, the elongated end seal 1066 is positioned at the end of the cutting portion 1007 to slow or prevent fluid from escaping through the end of the cutting portion 1007. The end cap 1068 includes a first end cap section 1076 and a second end cap section 1077. The end cap sections 1076,1077 are shown as being fastened to or otherwise associated with the end of the cutting portion 1007 to help position the elongated end seal 1066 and maintain the plugs 1046 in functional position.

FIG. 23 is an exploded perspective view of the tool 1000. When assembling one exemplary embodiment of the present invention, the device plugs 1046 are inserted into the holes 1045. In one embodiment, the end surface 1048 of the inserted plugs 1046 would be generally flush with the end surface 1013 of the working portion 1007. In still another embodiment of the present invention, the end surface 1048 of the plugs 1046 might extend slightly outwardly from the end surface 1013 of the working portion 1007 to ensure that the plug 1046 extends entirely within the holes 1045 and/or to allow slight compression of the plug 1046 by attachment of end cap 1068 to provide excellent sealing properties. Elongated end seal 1066 is placed over the end surface 1013 of the cutting portion 1007 to at least cover a portion of the end slot 1039. In one embodiment, as illustrated in FIG. 23, the end seal has enlarged ends adapted to extend over the end surface 1048 of the plugs 1046 to further prevent and/or restrict fluid flow. The first end cap section 1076 and the second end cap section 1078 are thereafter placed over the end surface 1013 of cutting portion 1007 such that alignment dowels 1072 are positioned within apertures 1071 in the end cap 1068 and apertures 1077 in the cutting portion.

Moreover, as illustrated in FIG. 24, the reverse side of the end cap sections 1076, 1078 can define a recess 1080 adapted to receive at least a portion of the elongated end seal 1066. In one embodiment, the depth of the recess 1080 is slightly less than the thickness of the end seal 1066 to cause compression of the end seal 1066 when the end cap sections 1076, 1078 are fastened to the cutting portion 1007, for instance, with fasteners 1070. The fasteners 1070 can pass through apertures 1069, such as countersunk bores, to be threaded within threaded apertures 1073 defined in the cutting portion 1007. One or more cartridges 1022, with corresponding working members 126, may be fastened to the cutting portion 1007. In addition, a nozzle 1015 may be inserted into the escape conduit 1014 to direct fluid adjacent each of the working members or blades 1026.

In use, pressurized fluid is supplied through conduit 1008 to pressurize a pressure chamber 1075 defined in the working portion between the plugs 1046 and the end seal 1066, thereby causing a first side 1034 and second side 1036 to flex or bias outwardly relative to one another and to thereby select and control the effective machining diameter of the tool 1000. Fluid may optionally travel through escape conduit 1014 to be dispensed by nozzle 1015 adjacent the working member or blade 1026 to provide lubrication, heat control, and/or chip removal. In addition, a relief portion 1042 may also be provided to reduce stress points within the tool 1000.

FIGS. 25, 26A, 26B, 27A, and 27B are provided as examples illustrating various methods relating to improved and unique procedures used to remove material from a workpiece with any of the above embodiments of the present invention. For illustrative purposes, the tool will be generally referenced with reference character 1200, however, it is understood that any tool mentioned above could be used in one or more of the below explained procedural steps.

FIG. 25 depicts a method wherein the tool 1200 is expanded to a first effective machining diameter $D_{e1}$. In addition to providing a workpiece 14, a tool 1200 is provided with a working portion 1207 and a working member 1226. Fluid pressure is provided to pivot the working member 1226 outwardly to at least one of a plurality of alternative use positions. As further illustrated in FIG. 25, the tool is moved towards the workpiece 14 (i.e., in the direction of the arrow) such that the working member 1226 removes material from the workpiece at an effective diameter $D_{e1}$ as the working member 1226 is applied to the workpiece 14.

As depicted in FIG. 26A, fluid pressure may be reduced to allow the tool 1200 to at least partially pivot the working member 1226 back to a reduced effective diameter or a non-use position, and then the tool 1200 is moved away (i.e., in the direction of the arrow in FIG. 26A) without removing additional material from the workpiece. It will be understood that the tool 1200 could be further moved away until the working member 1226 is radially clear of the workpiece 14, and thereafter increasing the fluid pressure to obtain another, greater effective diameter, and then moving the tool 1200 towards the workpiece 14 such that the working member 1226 removes additional material from the workpiece 14.

Alternatively, as illustrated in FIG. 26B, after machining the workpiece 14 in accordance with FIG. 25, the fluid pressure could be increased to further pivot and adjust the working member 1226 outwardly to at least a second use position having a second effective diameter $D_{e2}$. The tool 1200 could then be moved away from the workpiece 14 such that the working member removes additional material from the workpiece 14 as the working member 1226 is moved in a direction away from the workpiece 14.

It will be further understood that the pressure could be changed during the machining process of FIG. 25. For instance, once the tool 1200 is inserted a predetermined distance, the fluid pressure could be increased to likewise increase the effective bore diameter, for instance in a stepped manner. Alternatively, the fluid pressure could be constantly and/or dynamically changed as the tool 1200 is inserted, thereby creating a frustoconical shape.

As illustrated in FIG. 27A, the tool 1200 could have a substantially continuously decreasing pressure and correspondingly, decreasing effective working diameter, as the tool is inserted into the workpiece, thereby creating a frustoconical shape. For instance, the tool can initially be adjusted to an effective diameter $D_{e3}$ to begin the working process. The fluid pressure could gradually decrease as the tool is moved relative to the workpiece. For example, as shown in FIG. 27A, the tool obtains an intermediate effective diameter $D_{e4}$ as the tool is creating the frustoconical cavity. As further illustrated in FIG. 27B, the final cut is made by the tool having a smaller effective diameter $D_{e5}$. Once finished, as illustrated in FIG. 27B, the fluid pressure could be decreased to prevent removal of additional material as the tool is moved in a direction away from the workpiece. As illustrated in FIGS. 27A and 27B, a frustoconical cavity can be formed with a flared outer end. It will be understood, however, that using this method and a tool of the present invention, a cavity could be formed with a frustoconical shape with an inwardly flared end and/or a reduced outer end by continuously reducing the fluid pressure during the process step depicted in FIG. 26B.

In still other examples, the tools of the present invention can be used to create a bore having the shape of an hour-glass wherein the tool starts machining the workpiece with a relatively large initial diameter and then reduces the bore diameter to neck the bore down to a minimum intermediate diameter and thereafter increases the bore diameter to a larger final diameter. In other examples, the tools of the present invention could be used to create a substantially "barrel" shaped bore wherein the tool starts machining the workpiece with a smaller initial diameter and then increases the bore diameter to an intermediate maximum diameter and thereafter decreasing the bore diameter again to a smaller final diameter. In one specific example, the "barrel" shape can be approximated by forming two fructoconical cavities formed in succession. For instance, a first frustoconical cavity could be formed by initially machining the workpiece with a first-diameter and then increasing the bore diameter to a final larger diameter as the tool machines the workpiece. Next, the second frustoconical cavity can be formed by decreasing the bore diameter as the tool still further machines the workpiece until a final smaller bore diameter is obtained.

It will be understood that a wide and unlimited variety of bore diameters and shapes can be provided by appropriate fluid pressure control to adjust the effective working diameter in any number of ways during the boring or other working operations. It is therefore understood that a tool 1200 is provided that has a machining diameter that may be controlled as the tool is reciprocated relative to the workpiece to define an interior surface of various shapes.

The foregoing examples and various exemplary embodiments of the present invention set forth herein are provided for illustrative purposes only and are not intended to limit the scope of the invention defined by the claims. For example, each of the tools can be provided as a drilling tool, a reaming tool, a boring tool with the ability to provide counterbores, chambers and other features in a workpiece. Furthermore, the present invention can be used with through holes and/or blind holes. Additional embodiments of the present invention and advantages thereof will be apparent to one of ordinary skill in the art, and are within the scope of the invention defined by the following claims.

What is claimed is:

1. A method of removing material from a workpiece comprising the steps of:
   a) providing a tool extending along an axis, the tool including a cantilevered working portion with a working member;
   b) pivotally positioning the working member with respect to the tool axis to a plurality of alternative use positions by providing the tool with fluid at predetermined pressures to bend the cantilevered working portion to control the pivotal position of the working member with respect to the tool axis; and
   c) effectuating relative contacting movement between the tool and the workpiece in the alternative use positions of the working member to remove material from the workpiece at different distances from the tool axis by contacting the working member and the workpiece at the alternative use positions.

2. The method of claim 1, wherein the step of providing the tool with fluid comprises providing the tool with fluid comprising an incompressible fluid.

3. The method of claim 1, wherein the step of providing the tool with fluid comprises providing the tool with fluid comprising a liquid.

4. The method of claim 1, wherein the step of providing the tool with fluid comprises providing the tool with fluid comprising a lubricant.

5. The method of claim 1, wherein the step of providing the tool with fluid comprises providing the tool with fluid selected from the group consisting of emulsified water, water soluble coolant fluid, and oil.

6. The method of claim 1, wherein continuous contact between the working member and the workpiece is maintained as the working member is moved between the alternative use positions.

7. The method of claim 1, wherein a series of machining steps are performed by sequentially pivotally positioning the working member with respect to the tool axis to alternative use positions.

8. The method of claim 1, wherein the working portion further comprises a side surface and an end surface, wherein the working portion defines a passage passing through the end surface and the side surface in at least two locations, thereby dividing the working portion into at least a first section and a second section, wherein the fluid at the predetermined pressure biases a portion of the first section from a portion of the second section to control the pivotal position of the working member with respect to the tool axis.

9. The method of claim 8, wherein the tool further comprises at least one seal adapted to restrict fluid flow through at least one of the side surface and the end surface and at least partially defining a pressure chamber, wherein the pressure chamber is pressurized with the fluid to bias the portion of the first section from the portion of the second section to control the pivotal position of the working member with respect to the tool axis.

10. The method of claim 9, wherein the step of providing a tool extending along an axis with at least one seal comprises providing a tool with at least one seal comprising at least one plug received in an aperture defined in the working portion, wherein the at least one plug restricts fluid flow through at least the side surface.

11. The method of claim 9, wherein the step of providing a tool extending along an axis comprises providing a tool including a working portion with a cavity defined at least partially within the working portion, and providing the seal as a jacket received in the cavity.

12. The method of claim 11, wherein the step of providing the seal as a jacket received in the cavity includes providing the jacket with an open end and a closed end wherein the jacket is received in the cavity such that the closed end is located adjacent an end surface of the working portion.

13. The method of claim 11, further comprising the step of restraining the jacket within the cavity of the working portion with at least one end cap.

14. The method of claim 1, further comprising the steps of reducing the fluid pressure to allow the working member to pivot back toward the tool axis to a non-use position and moving the tool away from the workpiece without removing additional material from the workpiece.

15. The method of claim 14, further comprising the steps of moving the tool away from the workpiece until the working member is radially clear of the workpiece, increasing fluid pressure to pivot the working member outwardly with respect to the tool axis to at least a second use position and again moving the tool towards the workpiece such that the working member removes additional material from the workpiece.

16. The method of claim 1, further comprising the steps of increasing the fluid pressure to further pivot the working member outwardly with respect to the tool axis to at least a second use position and retracting the tool from the workpiece such that the working member removes additional material from the workpiece at a different effective diameter.

17. The method of claim 1, further comprising the steps of increasing the fluid pressure to further pivot the working member outwardly with respect to the tool axis to at least a second use position and moving the tool further towards the workpiece such that the working member removes additional material from the workpiece at a different effective diameter.

18. The method of claim 1, wherein the fluid pressure is changed while the tool is moving, thereby altering the effective diameter of the tool as desired.

19. The method of claim 18, wherein the fluid pressure is substantially continuously changed while the tool is moving.

20. The method of claim 18, wherein the tool forms a frustoconical cavity in the workpiece.

21. The method of claim 1, further comprising the step of disbursing an amount of the fluid from the working portion to facilitate the method of removing material from the workpiece.

22. The method of claim 1, wherein the step of providing a tool extending along an axis comprises providing a tool including a cantilevered working portion comprising a blade cartridge.

23. The method of claim 9, wherein the step of providing a tool extending along an axis with at least one seal comprises providing a tool with at least one seal comprising at least one elongated end seal located adjacent the end surface of the working portion, wherein the at least one elongated end seal restricts fluid flow through an end surface of the working portion.

24. The method of claim 8, wherein the step of providing a tool extending along an axis with a passage comprises providing the passage such that the passage is symmetrically disposed with the first section having approximately the same cross-sectional area as the second section.

25. The method of claim 8, wherein the step of providing a tool extending along an axis with a passage comprises providing the passage such that the passage is disposed with the first section and second section having different cross-sectional areas.

26. The method of claim 8, further comprising the step of disbursing an amount of the fluid from the working portion to facilitate the method of removing material from the workpiece.

27. The method of claim 9, further comprising the step of restraining the seal relative to the working portion with at least one end cap.

28. The method of claim 27, wherein the step of restraining the seal relative to the working portion with at least one end cap comprises restraining the seal relative to the working portion with at least one end cap including a recess formed in the end cap to receive a portion of the seal.

29. The method of claim 27, wherein the step of restraining the seal relative to the working portion with at least one end cap comprises restraining the seal relative to the working portion with at least one end cap comprising at least two end cap sections.

* * * * *